(12) United States Patent
Yamamoto et al.

(10) Patent No.: US 11,709,394 B2
(45) Date of Patent: Jul. 25, 2023

(54) LIGHT-EMITTING MODULE AND PLANAR LIGHT SOURCE

(71) Applicant: NICHIA CORPORATION, Anan (JP)

(72) Inventors: Yasumasa Yamamoto, Myozai-gun (JP); Yuki Shibutani, Komatsushima (JP); Makoto Katsuno, Naruto (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/868,056

(22) Filed: Jul. 19, 2022

(65) Prior Publication Data

US 2023/0030724 A1 Feb. 2, 2023

(30) Foreign Application Priority Data

Jul. 29, 2021 (JP) ................. 2021-124567

(51) Int. Cl.
*G02F 1/00* (2006.01)
*G02F 1/13357* (2006.01)

(52) U.S. Cl.
CPC .. *G02F 1/133603* (2013.01); *G02F 1/133605* (2013.01)

(58) Field of Classification Search
CPC ......... G02F 1/133603; G02F 1/133605; G02F 1/133608–133611
See application file for complete search history.

(56) References Cited

U.S. PATENT DOCUMENTS

2010/0296011 A1 11/2010 Hirano et al.
2012/0182761 A1 7/2012 Ikuta et al.
2012/0275139 A1* 11/2012 Chen ................... G02B 6/0025
362/97.2
2013/0250213 A1 9/2013 Tomomasa
2014/0160733 A1* 6/2014 Ono ................. G02F 1/133605
362/97.1
2018/0335559 A1* 11/2018 Cho ..................... G02B 6/0091
2019/0294004 A1* 9/2019 Hashimoto ......... H01L 25/0753
(Continued)

FOREIGN PATENT DOCUMENTS

JP 2011-008212 A 1/2011
JP 2012-054041 A 3/2012
(Continued)

*Primary Examiner* — Gerald J Sufleta, II
(74) *Attorney, Agent, or Firm* — Foley & Lardner LLP

(57) ABSTRACT

A light-emitting module includes a light guide member including a first light guide portion including a first upper surface, a first lower surface, a first lateral surface, a first extending portion facing the first lateral surface and extending continuously from a portion of the first lateral surface, and a first hole portion, and a second light guide portion including a second upper surface, a second lower surface, a second lateral surface, a second extending portion facing the second lateral surface and extending continuously from a portion of the second lateral surface, and a second hole portion; a light source unit including a first light source disposed in the first hole portion, and a second light source disposed in the second hole portion; and a first light-reflective member covering at least a portion of the first lateral surface facing the first extending portion and at least a portion of the first extending portion facing the first lateral surface, in which the first extending portion faces the second extending portion.

9 Claims, 13 Drawing Sheets

(56) References Cited

U.S. PATENT DOCUMENTS

| | | | | |
|---|---|---|---|---|
| 2019/0294005 A1* | 9/2019 | Imada | .................. | G02B 6/0026 |
| 2020/0049877 A1* | 2/2020 | Watanabe | ............ | G02B 6/0025 |
| 2020/0176650 A1* | 6/2020 | Achi | .................... | G02B 6/0016 |
| 2021/0096291 A1 | 4/2021 | Emura | | |
| 2021/0318483 A1* | 10/2021 | Hiramoto | ............. | G02B 6/0045 |

FOREIGN PATENT DOCUMENTS

| | | |
|---|---|---|
| JP | 2012-054042 A | 3/2012 |
| JP | 2018-101521 A | 6/2018 |
| JP | 2019-215956 A | 12/2019 |
| JP | 2021-036536 A | 3/2021 |
| JP | 2021-057586 A | 4/2021 |
| WO | WO-2011/043003 A1 | 4/2011 |
| WO | WO-2012/077534 A1 | 6/2012 |
| WO | WO-2018/116815 A1 | 6/2018 |

* cited by examiner

LIGHT-EMITTING MODULE AND PLANAR LIGHT SOURCE

CROSS-REFERENCE TO RELATED APPLICATION

This application claims priority to Japanese Patent Application No. 2021-124567, filed on Jul. 29, 2021, the disclosure of which is hereby incorporated by reference in its entirety.

BACKGROUND

The present disclosure relates to a light-emitting module and a planar light source.

Light-emitting modules in which a light-emitting element such as a light-emitting diode and a light guide plate are combined are widely utilized in planar light sources such as a backlight for a liquid crystal display, for example. Further, planar light sources in which a light guide plate is divided into a plurality of regions by grooves to allow for controlling emission/non-emission for each region have also been proposed (for example, see JP 2018-101521 A).

SUMMARY

There has been a demand for a planar light source that further increases a difference in brightness/darkness between an emission region and a non-emission region. An object of an embodiment according to the present invention is to provide a light-emitting module and a planar light source that can increase a difference in brightness/darkness between a light-emitting region and a non-light-emitting region.

According to an aspect of the present invention, a light-emitting module includes a light guide member including a first light guide portion including a first upper surface, a first lower surface positioned on a side opposite to the first upper surface, a first lateral surface positioned between the first upper surface and the first lower surface, a first extending portion facing the first lateral surface and extending continuously from a portion of the first lateral surface positioned on the first lower surface side of the first upper surface, and a first hole portion open at the first lower surface, and a second light guide portion including a second upper surface, a second lower surface positioned on a side opposite to the second upper surface, a second lateral surface positioned between the second upper surface and the second lower surface, a second extending portion facing the second lateral surface and extending continuously from a portion of the second lateral surface positioned on the second lower surface side of the second upper surface, and a second hole portion open at the second lower surface; a light source unit including a first light source positioned on the first lower surface side and disposed in the first hole portion, and a second light source positioned on the second lower surface side and disposed in the second hole portion; and a first light-reflective member covering at least a portion of the first lateral surface facing the first extending portion and at least a portion of the first extending portion facing the first lateral surface, in which the first extending portion faces the second extending portion.

According to a light-emitting module and a planar light source of an embodiment of the present invention, a difference in brightness/darkness between a light-emitting region and the non-light-emitting region can be increased.

DETAILED DESCRIPTION

Figure 1:
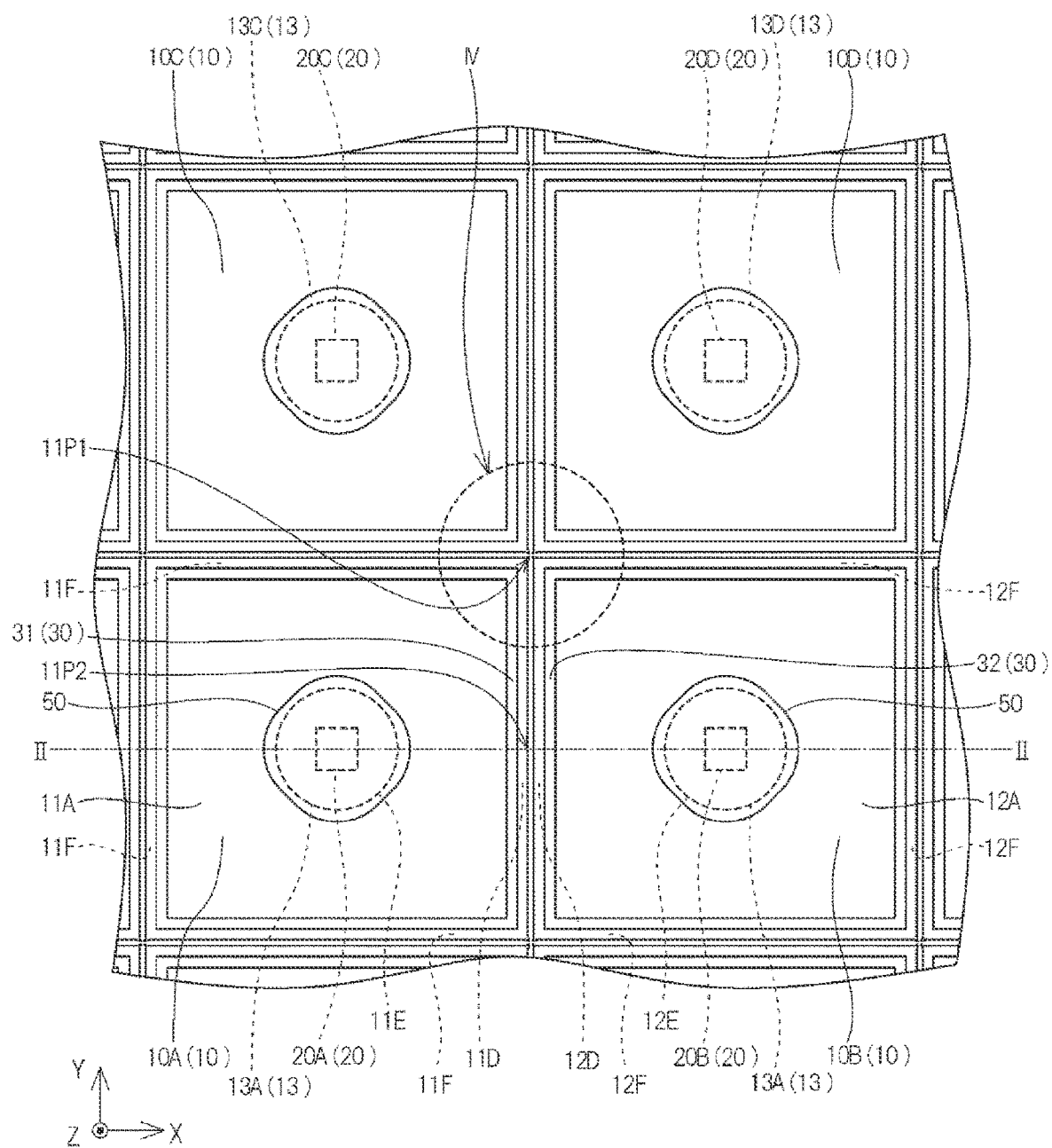
FIG. 1 is a schematic plan view illustrating a planar light source according to an embodiment.

Certain embodiments will be described below with reference to the drawings. The drawings are diagrams that schematically illustrate embodiments, and thus scales and intervals of members, positional relationships, and the like are exaggerated, or some of the members may not be illustrated in the drawings. The schematic plan views illustrating a planar light source illustrated in FIG. 1 and the like are drawings of the planar light source viewed from above. In the present specification, a direction of an arrow on a Z axis is upward. Further, as a cross-sectional view, an end view illustrating only a cut surface may be used.

In the following description, components having substantially the same function may be denoted by the same reference signs and a repeated description thereof may be omitted. Further, terms indicating a specific direction or position ("upper," "lower," and other terms including these terms, for example) may be used. Nevertheless, these terms are used merely to make it easy to understand relative directions or positions in the referenced drawing. As long as the relative direction or position is the same as that described in the referenced drawing using the term such as "upper" or "lower," in drawings other than the drawings of the present disclosure, actual products, and the like, components need not necessarily be arranged in the same manner as in the referenced drawing. In the present specification, "parallel" includes not only a case in which two straight lines, sides, surfaces, or the like do not intersect even if extended, but also a case in which angles formed by two straight lines, sides, surfaces, or the like intersect in a range of 10° or less. In the present specification, the positional relationship expressed as "above" includes a case of being in contact and a case of not being in contact but being positioned above.

Embodiments

Figure 2:
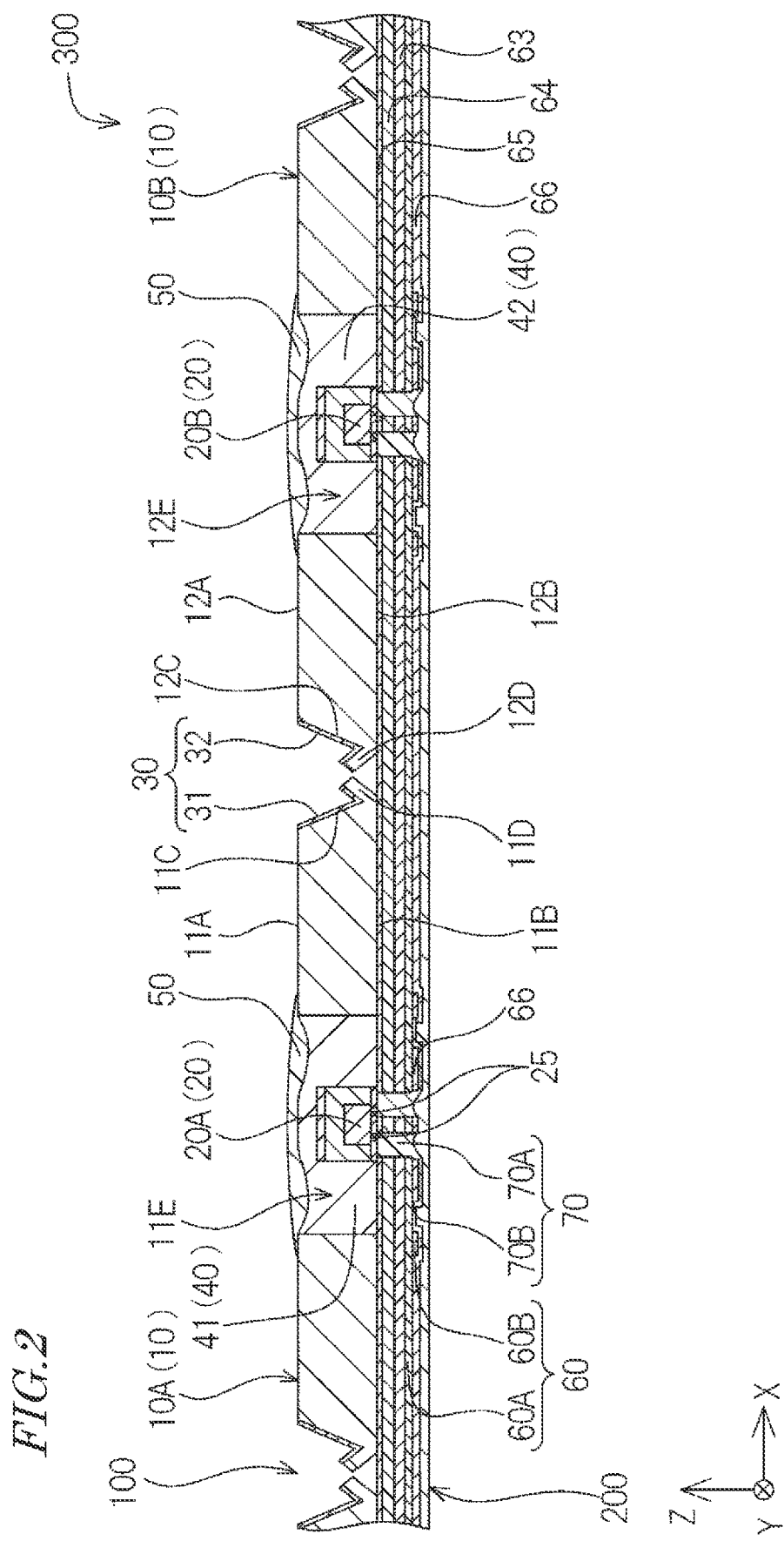
FIG. 2 is a schematic cross-sectional view taken along line II-II illustrated in FIG. 1.

A planar light source 300 of an embodiment will now be described with reference to FIGS. 1 to 8B. For example, as illustrated in FIG. 2, the planar light source 300 includes a light-emitting module 100 and a support member 200. The light-emitting module 100 is disposed on the support member 200. The light-emitting module 100 includes a light guide member 10, a light source unit 20, and a light-reflective member 30. The light guide member 10 includes a first light guide portion 10A and a second light guide portion 10B. The light guide member 10 may further include a third light guide portion 10C and a fourth light guide portion 10D. The number of the light guide portions of the light guide member 10 can be set as appropriate. The first light guide portion 10A includes a first upper surface 11A, a first lower surface 11B, a first lateral surface 11C, a first extending portion 11D, and a first hole portion 11E. The first lower surface 11B is positioned on a side opposite to the first upper surface 11A. The first lateral surface 11C is positioned between the first upper surface 11A and the first lower surface 11B. The first extending portion 11D extends continuously from a portion of the first lateral surface 11C positioned closer to the first lower surface 11B than the first upper surface 11A. The first extending portion 11D is a portion of the first light guide portion 10A different from the first lateral surface 11C. The first extending portion 11D faces the first lateral surface 11C. The first hole portion 11E opens in the first lower surface 11B. The second light guide portion 10B includes a second upper surface 12A, a second lower surface 12B, a second lateral surface 12C, a second extending portion 12D, and a second hole portion 12E. The second lower surface 12B is positioned on a side opposite to the second upper surface 12A. The second lateral surface 12C is positioned between the second upper surface 12A and the second lower surface 12B. The second extending portion 12D extends continuously from a portion of the second lateral surface 12C positioned closer to the second lower surface 12B than the second upper surface 12A. The second extending portion 12D is a portion of the second light guide portion 10B different from the second lateral surface 12C. The second extending portion 12D faces the second lateral surface 12C. The first extending portion 11D faces the second extending portion 12D. The second hole portion 12E opens in the second lower surface 12B. The light source unit 20 includes a first light source 20A and a second light source 20B. The light source unit 20 may further include a third light source 20C and a fourth light source 20D. The number of the light source units 20 of the planar light source 300 can be set as appropriate. The first light source 20A is positioned on the first lower surface 11B side. The first light source 20A is disposed in the first hole portion 11E. The second light source 20B is positioned on the second lower surface 12B side. The second light source 20B is disposed in the second hole portion 12E. The light-reflective member 30 includes a first light-reflective member 31. The first light-reflective member 31 covers at least a portion of the first lateral surface 11C facing the first extending portion 11D. The first light-reflective member 31 covers at least a portion of the first extending portion 11D facing the first lateral surface 11C. The first light source 20A and the second light source 20B are disposed side by side in a first direction. A direction parallel to at least a portion of the first lower surface 11B and orthogonal to the first direction is referred to as a second direction. Further, a direction orthogonal to the first direction and the second direction is referred to as a third direction. In FIG. 1, the first direction is an X direction, the second direction is a Y direction, and the third direction is a Z direction. A direction from the first light source 20A side toward the second light source 20B side may be referred to as a +X direction, and a direction from the second light source 20B side toward the first light source 20A side may be referred to as a −X direction. A direction from the first upper surface 11A side toward the first lower surface 11B side may be referred to as a −Z direction.

The first light-reflective member 31 covers at least a portion of the first lateral surface 11C facing the first extending portion 11D and at least a portion of the first extending portion 11D facing the first lateral surface 11C. Therefore, a portion of light output from the first light source 20A and traveling in the +X direction can be blocked by the first light-reflective member 31. Thus, it is possible to inhibit a portion of the light exiting from the first light source 20A and traveling in the +X direction from striking the second light guide portion 10B. Accordingly, a difference in brightness/darkness between a light-emitting region and a non-light-emitting region can be increased. For example, a difference in brightness/darkness between the first light guide portion 10A and the second light guide portion 10B in a case in which the first light source 20A is turned on and the second light source 20B is not turned on can be increased. At least a portion of the first lateral surface 11C facing the first extending portion 11D is at least a portion of the first lateral surface 11C overlapping the first extending portion 11D in the first direction (X direction). At least a portion of the first extending portion 11D facing the first lateral surface 11C is at least a portion of a first extending portion 11DC overlapping the first lateral surface 11C in the first direction (X direction).

Hereinafter, the elements constituting the planar light source 300 will be described in detail.

Light Guide Member 10

The light guide member 10 is a member having transmissivity with respect to the light emitted by the light source unit 20. A transmittance of the light guide member 10 with respect to a peak wavelength of the first light source 20A is, for example, preferably at least 60%, and more preferably at least 80%. The light guide member 10 includes the first light guide portion 10A and the second light guide portion 10B adjacent in the first direction (X direction). The light guide member 10 may further include the third light guide portion 10C adjacent to the first light guide portion 10A and the fourth light guide portion 10D adjacent to the second light guide portion 10B in the second direction (Y direction). The third light guide portion 10C and the fourth light guide portion 10D are adjacent in the first direction (X direction). Note that the second light guide portion 10B, the third light guide portion 10C, and the fourth light guide portion 10D each have a structure similar to that of the first light guide portion 10A, and thus description thereof will be omitted.

As the material of the light guide member 10, a thermoplastic resin such as acrylic, polycarbonate, cyclic polyolefin, polyethylene terephthalate, or polyester, a thermosetting resin such as epoxy or silicone, or glass can be used, for example.

A thickness of the light guide member 10 is preferably in a range from 150 μm to 800 μm, for example. In the present specification, a thickness of each member is a maximum value from an upper surface of each member positioned in the third direction (Z direction) to a lower surface of each member. The light guide member 10 may be constituted by a single layer or may be constituted by a layered body of a plurality of layers in the third direction. In a case in which the light guide member 10 is constituted by a layered body, an adhesive member having transmissivity may be disposed between each of the layers. Each layer of the layered body may employ different types of materials. As the material of the adhesive member, a thermoplastic resin such as acrylic, polycarbonate, cyclic polyolefin, polyethylene terephthalate, or polyester, or a thermosetting resin such as epoxy or silicone, can be used, for example.

As illustrated in FIG. 2, the first light guide portion 10A includes the first upper surface 11A serving as a light-emitting surface of the planar light source 300 and the first lower surface 11B positioned on a side opposite to the first upper surface 11A. The first light guide portion 10A includes the first lateral surface 11C positioned between the first upper surface 11A and the first lower surface 11B. In a cross-sectional view, the first lateral surface 11C may be straight, may be curved, or may have protrusions and recessions. As illustrated in FIG. 2, the first lateral surface 11C is preferably inclined in a direction in which a width of the first upper surface 11A in the first direction narrows. With this structure, the light output from the first light source 20A and traveling in the +X direction is readily reflected in the −Z direction by the first light-reflective member 31 covering the first lateral surface 11C. This allows for inhibiting an increase in brightness in the vicinity of the first lateral surface 11C.

Figure 3A:
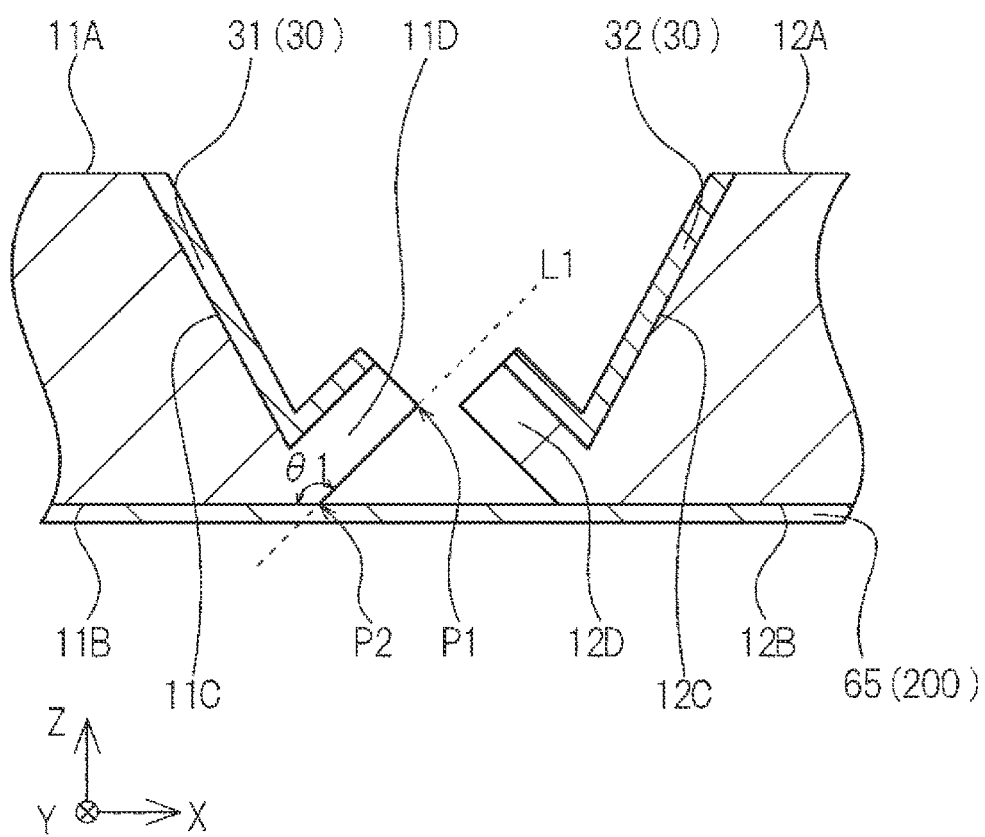
FIG. 3A is a schematic cross-sectional view illustrating a periphery of a first extending portion, a second extending portion, and a first reflective member according to the embodiment.

The first light guide portion 10A includes the first extending portion 11D that extends continuously from a portion of the first lateral surface 11C positioned closer to the first lower surface 11B than the first upper surface 11A. The first extending portion 11D faces the first lateral surface 11C in the first direction (X direction). In other words, at least a portion of the first extending portion 11D overlaps the first lateral surface 11C in the first direction (X direction). As illustrated in FIG. 3A, the first extending portion 11D preferably extends continuously from the first lower surface 11B. With this structure, a height of the first extending portion 11D in the third direction (Z direction) is easily lowered. Therefore, a height in the third direction (Z direction) of the first light-reflective member 31 covering the first extending portion 11D is also easily lowered. The first light source 20A is positioned on the first lower surface 11B side and thus, by the lowering of the height of the first light-reflective member 31 in the third direction (Z direction), the light output from the first light source 20A and traveling in the +X direction readily strikes the first light-reflective member 31. This allows for increasing the difference in brightness/darkness between the light-emitting region and the non-light-emitting region. Note that, in the present specification, the height being lowered means being lowered in the −Z direction.

As illustrated in FIG. 1, the first light guide portion 10A preferably includes a third extending portion 11F extending continuously from a portion of a lateral surface of the first light guide portion 10A other than the first lateral surface facing the second light guide portion 10B. The third extending portion 11F has a shape similar to that of the first extending portion 11D. The third extending portion 11F is covered by a member similar to the light-reflective member 30. With this structure, it is possible to increase the difference in brightness/darkness between the light-emitting region and the non-light-emitting region on a lateral surface of the first light guide portion 10A other than the first lateral surface as well. The first extending portion 11D and the third extending portion 11F are connected. In a plan view, the first light source 20A is preferably seamlessly surrounded by the first extending portion 11D and the third extending portion 11F. Note that the first extending portion 11D and the third extending portion 11F may be separated.

As illustrated in FIG. 2, the second light guide portion 10B includes the second upper surface 12A serving as a light-emitting surface of the planar light source 300 and the second lower surface 12B positioned on a side opposite to the second upper surface 12A. The second light guide portion 10B includes the second lateral surface 12C positioned between the second upper surface 12A and the second lower surface 12B. In a cross-sectional view, the second lateral surface 12C may be straight, may be curved, or may have protrusions and recessions. As illustrated in FIG. 2, the second lateral surface 12C is preferably inclined in a direction in which a width of the second upper surface 12A in the first direction narrows. With this structure, light output from the second light source 20B and traveling in the −X direction is readily reflected in the −Z direction by the light-reflective member 30 covering the second lateral surface 12C. This allows for inhibiting an increase in brightness in the vicinity of the second lateral surface 12C.

The second light guide portion 10B includes the second extending portion 12D that extends continuously from a portion of the second lateral surface 12C positioned closer to the second lower surface 12B than the second upper surface 12A. The second extending portion 12D faces the second lateral surface 12C in the first direction (X direction). The first extending portion 11D faces the second extending portion 12D. In other words, at least a portion of the first extending portion 11D overlaps the second extending portion 12D in the first direction (X direction). As illustrated in FIG. 3A, the second extending portion 12D may extend continuously from the second lower surface 12B. The second extending portion 12D has a structure similar to that of the first extending portion 11D, and thus description thereof will be omitted.

As illustrated in FIG. 1, the second light guide portion 10B preferably includes a fourth extending portion 12F extending continuously from a portion of a lateral surface of the second light guide portion 10B other than the second lateral surface facing the first light guide portion 10A. The fourth extending portion 12F has a shape similar to that of the second extending portion 12D. The fourth extending portion 12F is covered by a member similar to the light-reflective member 30. With this structure, it is possible to increase the difference in brightness/darkness between the light-emitting region and the non-light-emitting region on a lateral surface of the second light guide portion 10B other than the second lateral surface as well. The second extending portion 12D and the fourth extending portion 12F are connected. In a plan view, the second light source 20B is preferably seamlessly surrounded by the second extending portion 12D and the fourth extending portion 12F. Note that the second extending portion 12D and the fourth extending portion 12F may be separated.

Figure 3B:
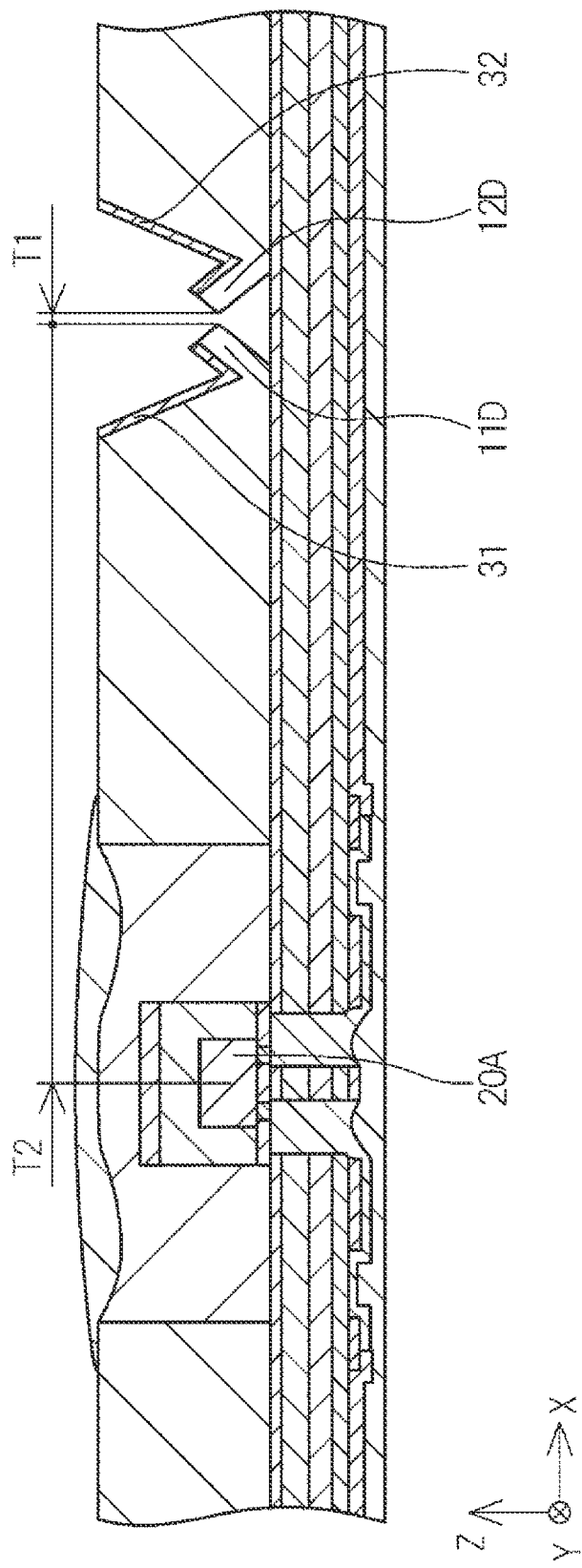
FIG. 3B is a schematic cross-sectional view illustrating the periphery of the first extending portion, the second extending portion, and a first light source according to the embodiment.

A minimum length in the first direction (X direction) from the first extending portion 11D to the second extending portion 12D is not particularly limited. As illustrated in FIG. 3B, a minimum length T1 from the first extending portion 11D to the second extending portion 12D in the first direction (X direction) is in a range from 0.01 times to 0.1 times a maximum length T2 from a center of the first light source 20A to the first extending portion 11D in the first direction (X direction) in a cross-sectional view. With the minimum length T1 from the first extending portion 11D to the second extending portion 12D in the first direction (X direction) being at least 0.01 times the maximum length T2 from the center of the first light source 20A to the first extending portion 11D in the first direction (X direction) in a cross-sectional view, an increase in brightness between the first extending portion 11D and the second extending portion 12D can be reduced. With the minimum length T1 from the first extending portion 11D to the second extending portion 12D in the first direction (X direction) being at most 0.1 times the maximum length T2 from the center of the first light source 20A to the first extending portion 11D in the first direction (X direction) in a cross-sectional view, a reduction in brightness between the first extending portion 11D and the second extending portion 12D can be reduced. The center of the first light source 20A in a cross-sectional view refers to a centroid of the first light source 20A in a cross-sectional view.

In a cross-sectional view illustrated in FIG. 3A, an angle formed by the first lower surface 11B and a line L1 connecting a point P1 that is within the first extending portion 11D and is closest to the second light guide portion 10B and a point P2 that is within the first lower surface 11B and is closest to the second light guide portion 10B can be set to any appropriate degree. An angle θ1 formed by the first lower surface 11B and the line L1 connecting the point P1 that is within the first extending portion 11D and is closest to the second light guide portion 10B and the point P2 that is within the first lower surface 11B and is closest to the second light guide portion 10B in a cross-sectional view is preferably in a range of from 105° to 165°. With the angle θ1 formed by the first lower surface 11B and the line L1 connecting the point P1 that is within the first extending portion 11D and is closest to the second light guide portion 10B and the point P2 that is within the first lower surface 11B and is closest to the second light guide portion 10B in a cross-sectional view preferably being at least 105°, the minimum length from the first extending portion 11D to the second extending portion 12D in the first direction (X direction) can be shortened. This structure allows for inhibiting a reduction in brightness between the first extending portion 11D and the second extending portion 12D. With the angle θ1 formed by the first lower surface 11B and the line L1 connecting the point P1 that is within the first extending portion 11D and is closest to the second light guide portion 10B and the point P2 that is within the first lower surface 11B and is closest to the second light guide portion 10B in a cross-sectional view preferably being at most 165°, the height of the first extending portion 11D in the third direction (Z direction) can be easily increased. Therefore, the height in the third direction (Z direction) of a first reflective member covering the first extending portion 11D is also easily increased. Thus, a portion of the light output from the first light source 20A and traveling in the +X direction can be readily blocked by the first light-reflective member 31. Further, the angle θ1 formed by the first lower surface 11B and the line L1 connecting the point P1 that is within the first extending portion 11D and is closest to the second light guide portion 10B and the point P2 that is within the first lower surface 11B and is closest to the second light guide portion 10B may be in a range from 105° to 135°. With the angle θ1 formed by the first lower surface 11B and the line L1 connecting the point P1 that is within the first extending portion 11D and is closest to the second light guide portion 10B and the point P2 that is within the first lower surface 11B and is closest to the second light guide portion 10B preferably being at most 135° in a cross-sectional view, a portion of the light output from the first light source 20A and traveling in the +X direction is readily blocked by the first light-reflective member 31. Further, the angle θ1 formed by the first lower surface 11B and the line L1 connecting the point P1 that is within the first extending portion 11D and is closest to the second light guide portion 10B and the point P2 that is within the first lower surface 11B and is closest to the second light guide portion 10B may be in a range from 145° to 165°. With the angle θ1 formed by the first lower surface 11B and the line L1 connecting the point P1 that is within the first extending portion 11D and is closest to the second light guide portion 10B and the point P2 that is within the first lower surface 11B and is closest to the second light guide portion 10B in a cross-sectional view preferably being at least 145°, the minimum length from the first extending portion 11D to the second extending portion 12D in the first direction (X direction) can be shortened.

Figure 4:
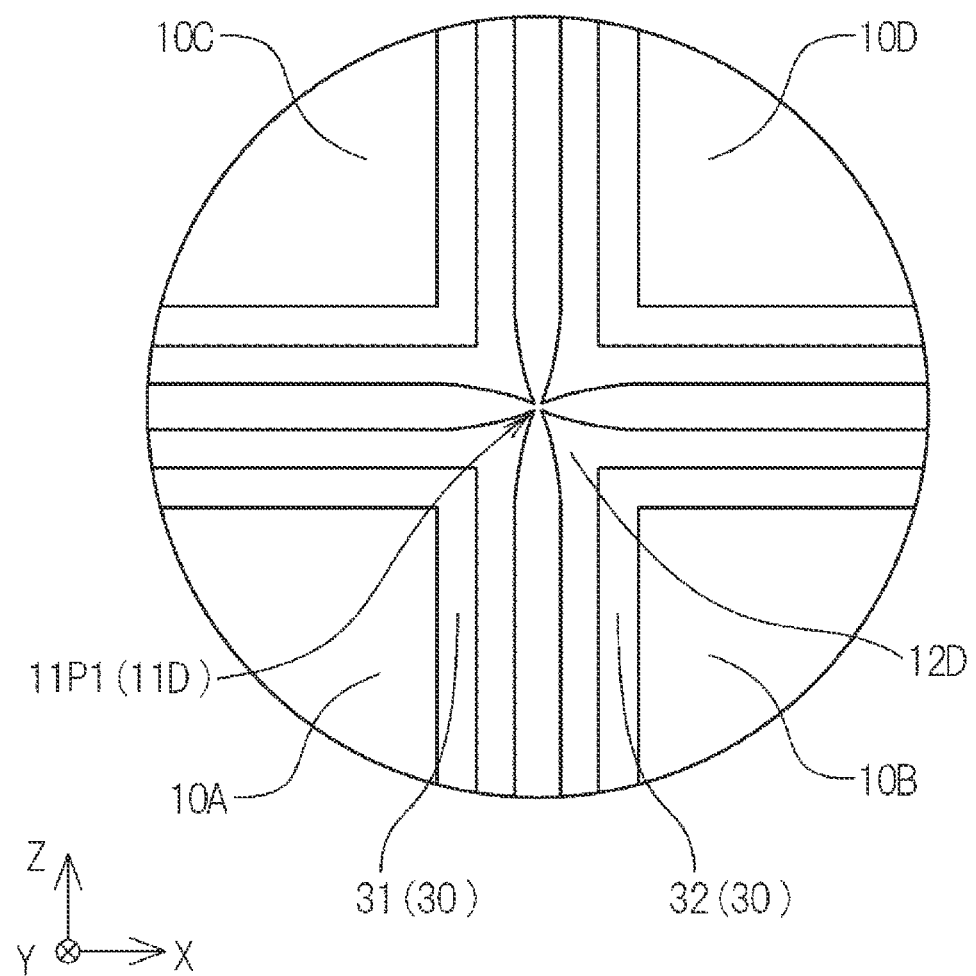
FIG. 4 is a schematic plan view illustrated a region IV in FIG. 1.

A minimum length from an outer edge of the first extending portion 11D farthest from the center of the first light source 20A to the second light guide portion 10B in a plan view is not particularly limited. As illustrated in FIGS. 1 and 4, the minimum length from an outer edge 11P1 of the first extending portion 11D farthest from the center of the first light source 20A to the second light guide portion 10B in a plan view is preferably shorter than a minimum length from an outer edge 11P2 of the first extending portion 11D closest to the center of the first light source 20A to the second light guide portion 10B in a plan view. The brightness tends to decrease as the distance from the first light source 20A increases. Therefore, with the minimum length from the outer edge 11P1 of the first extending portion farthest from the center of the first light source to the second light guide portion 10B in a plan view being shortened, it is possible to reduce a decrease in brightness in the vicinity of the outer edge of the first extending portion farthest from the center of the first light source in a plan view. As illustrated in FIG. 4, the outer edge 11P1 of the first extending portion 11D farthest from the center of the first light source preferably extends toward the second light guide portion 10B in a plan view. With this structure, it becomes easy to shorten the minimum length from the outer edge 11P1 of the first extending portion 11D farthest from the center of the first light source 20A to the second light guide portion 10B in a plan view. As illustrated in FIG. 4, the outer edge 11P1 of the first extending portion 11D farthest from the center of the first light source 20A preferably extends toward the third light guide portion 10C and the fourth light guide portion 10D in a plan view. With this structure, it is possible to reduce a decrease in brightness in the vicinity of the outer edge of the first extending portion farthest from the center of the first light source in a plan view. Similarly, a minimum length from an outer edge of the second extending portion 12D farthest from a center of the second light source 20B to the first light guide portion 10A in a plan view is preferably shorter than a minimum length from an outer edge of the second extending portion 12D closest to the center of the second light source 20B to the first light guide portion 10A in a plan view.

Figure 5:
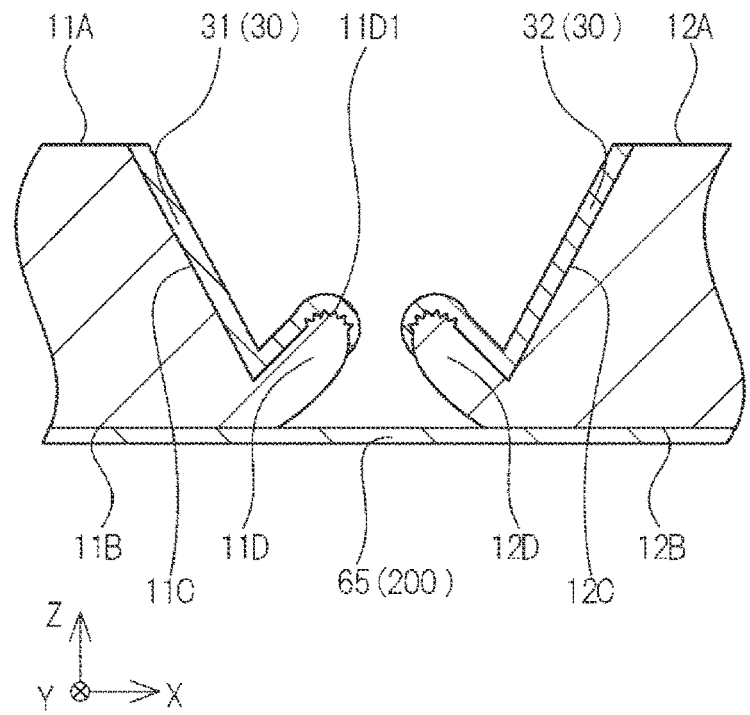
FIG. 5 is a schematic cross-sectional view illustrating a periphery of a modified example of the first extending portion, the second extending portion, and the first reflective member according to the embodiment.

In a cross-sectional view, a portion of the outer edge of the first extending portion may be straight, may be curved, or may have protrusions and recessions. For example, as illustrated in FIG. 5, the first extending portion 11D may include a plurality of protruding portions 11D1. The protruding portions 11D1 of the first extending portion 11D are each covered by the first light-reflective member 31, and thus the area in which the first extending portion 11D and the first light-reflective member 31 are in contact can be increased. This allows for improving an adhesion of the first extending portion 11D and the first light-reflective member 31. Note that the first extending portion 11D may include one protruding portion. Further, as illustrated in FIG. 5, in a cross-sectional view, at least a portion of a lower surface of the first extending portion 11D is preferably curved. For example, even when an external force is applied to the first extending portion 11D when the first light guide portion 10A is disposed on the support body 200, with at least a portion of the lower surface of the first extending portion 11D being curved in a cross-sectional view, chipping of the lower surface of the first extending portion 11D can be reduced.

The first light guide portion 10A includes the first hole portion 11E in which the first light source 20A is disposed. The second light guide portion 10B includes the second hole portion 12E in which the second light source 20B is disposed. The first hole portion 11E is a through hole penetrating from the first upper surface 11A to the first lower surface 11B. The first hole portion 11E may be a recessed portion that opens only to the first lower surface 11B side. In a case in which the first hole portion 11E is a recessed portion, the first hole portion 11E includes a bottom surface formed by the first light guide portion 10A. The second hole portion 12E is a through hole penetrating from the second upper surface 12A to the second lower surface 12B. The second hole portion 12E may be a recessed portion that opens only to the second lower surface 12B side. In a case in which the second hole portion 12E is a recessed portion, the second hole portion 12E includes a bottom surface formed by the second light guide portion 10B.

A shape of the first hole portion 11E and the second hole portion 12E in a plan view is not particularly limited. As illustrated in FIG. 1, in a plan view, the first hole portion 11E and the second hole portion 12E may be circular. In a plan view, the first hole portion 11E and the second hole portion 12E may be elliptical or polygonal, such as triangular, quadrangular, hexagonal, or octagonal.

Light Source Unit 20

The light source unit 20 includes the first light source 20A and the second light source 20B. The light source unit 20 may further include the third light source 20C and the fourth light source 20D. The first light source 20A is disposed in the first hole portion 11E. Note that one first light source 20A may be disposed in the first hole portion 11E or a plurality of the first light sources 20A may be disposed in the first hole portion 11E. The second light source 20B is disposed in the second hole portion 12E. Note that one second light source 20B may be disposed in the second hole portion 12E or a plurality of the second light sources 20B may be disposed in the second hole portion 12E. The second light source 20B, the third light source 20C, and the fourth light source 20D each have a structure similar to that of the first light source 20A, and thus description thereof will be omitted as appropriate.

Figure 6:
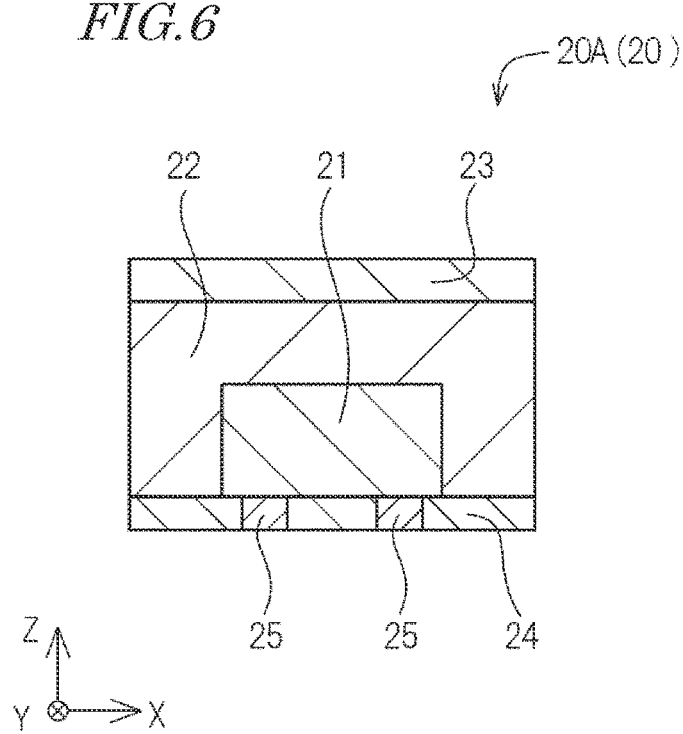
FIG. 6 is a schematic cross-sectional view of the first light source according to the embodiment.

As illustrated in FIG. 6, the first light source 20A includes a light-emitting element 21. The light-emitting element 21 includes a semiconductor layered body. The semiconductor layered body includes an n-type semiconductor layer, a p-type semiconductor layer, and a light-emitting layer interposed therebetween. The light-emitting layer may have a structure such as a double heterojunction or a single quantum well (SQW) structure, or may have a structure with a group of active layers such as a multiple quantum well (MQW) structure. The semiconductor layered body is configured to emit visible light or ultraviolet light. The semiconductor layered body including such a light-emitting layer is, for example, $In_XAl_YGa_{1-X-Y}N$ ($0 \le X$, $0 \le Y$, and $X+Y \le 1$).

The semiconductor layered body may have a structure including one or more light-emitting layers between the n-type semiconductor layer and the p-type semiconductor layer, or may have a structure in which a structure sequentially including the n-type semiconductor layer, the light-emitting layer, and the p-type semiconductor layer is repeated a plurality of times. In a case in which the semiconductor layered body includes a plurality of the light-emitting layers, light-emitting layers having different light emission peak wavelengths may be included or light-emitting layers having the same light emission peak wavelength may be included. Note that having the same light emission peak wavelength includes a case in which there is a variation of about a few nm. A combination of light emission peak wavelengths across the plurality of light-emitting layers can be selected as appropriate. For example, in a case in which the semiconductor layered body includes two light-emitting layers, the light-emitting layers can be selected in combinations of blue light and blue light, green light and green light, red light and red light, ultraviolet light and ultraviolet light, blue light and green light, blue light and red light, or green light and red light. Each of the light-emitting layers may include a plurality of active layers having different light emission peak wavelengths, or may include a plurality of active layers having the same light emission peak wavelength.

As illustrated in FIG. 6, the first light source 20A can further include a light source light-transmissive member 22. The light source light-transmissive member 22 covers an upper surface and lateral surfaces of the light-emitting element 21. The light source light-transmissive member 22 protects the light-emitting element 21 and includes functions such as wavelength conversion and light diffusion in accordance with particles added to the light source light-transmissive member 22.

For example, the light source light-transmissive member 22 includes a light-transmissive resin, and may further include a phosphor. As the light-transmissive resin, a silicone resin or an epoxy resin can be used, for example. Further, as the phosphor, an yttrium aluminum garnet based phosphor (for example, $Y_3(Al,Ga)_5O_{12}$:Ce), a lutetium aluminum garnet based phosphor (for example, $Lu_3(Al,Ga)_5O_{12}$:Ce), a terbium aluminum garnet based phosphor (for example, $Tb_3(Al,Ga)_5O_{12}$:Ce), a CCA based phosphor (for example, $Ca_{10}(PO_4)_6Cl_2$:Eu), an SAE based phosphor (for example, $Sr_4Al_{14}O_{25}$:Eu), a chlorosilicate based phosphor (for example, $Ca_8MgSi_4O_{16}Cl_2$:Eu), a β-SiAlON based phosphor (for example, $(Si,Al)_3(O,N)_4$:Eu), an α-SiAlON based phosphor (for example, $Ca(Si,Al)_{12}(O,N)_{16}$:Eu), an SLA based phosphor (for example, $SrLiAl_3N_4$:Eu), a nitride based phosphor such as a CASN based phosphor (for example, $CaAlSiN_3$:Eu) or an SCASN based phosphor (for example, $(Sr,Ca)AlSiN_3$:Eu), a fluoride based phosphor such as a KSF based phosphor (for example, $K_2SiF_6$:Mn), a KSAF based phosphor (for example, K2Si0.99Al0.01F5.99:Mn), or an MGF based phosphor (for example, $3.5MgO0.5MgF_2GeO_2$:Mn), a phosphor having a perovskite structure (for example, $CsPb(F,Cl,Br,I)_3$), a quantum dot phosphor (for example, CdSe, InP, $AgInS_2$, or AgInSe2), or the like can be used. As the phosphor added to the light source light-transmissive member 22, one type of phosphor may be used, or a plurality of types of phosphors may be used.

The KSAF based phosphor may have a composition represented by Formula (I) below.

$$M_2[Si_pAl_qMn_rF_s] \quad (I)$$

In Formula (I), M represents an alkali metal and may include at least K. Mn may be a tetravalent Mn ion. p, q, r, and s may satisfy $0.9 \leq p+q+r \leq 1.1$, $0 < q \leq 0.1$, $0 < r \leq 0.2$, $5.9 \leq s \leq 6.1$. Preferably $0.95 \leq p+q+r \leq 1.05$ or $0.97 \leq p+q+r \leq 1.03$, $0 < q \leq 0.03$, $0.002 \leq q \leq 0.02$ or $0.003 \leq q \leq 0.015$, $0.005 \leq r \leq 0.15$, $0.01 \leq r \leq 0.12$ or $0.015 \leq r \leq 0.1$, $5.92 \leq s \leq 6.05$ or $5.95 \leq s \leq 6.025$. Examples thereof include compositions represented by $K_2[Si_{0.946}Al_{0.005}Mn_{0.049}F_{5.995}]$, $K_2[Si_{0.942}Al_{0.008}Mn_{0.050}F_{5.992}]$, $K_2[Si_{0.939}Al_{0.014}Mn_{0.047}F_{5.986}]$. According to such a KSAF based phosphor, it is possible to obtain red light emission having a high brightness and a narrow half band width of the light emission peak wavelength.

Further, a wavelength conversion sheet containing the phosphor described above may be disposed on the planar light source 300. The wavelength conversion sheet can serve as a planar light source that absorbs a portion of the blue light from the light source unit 20, emits yellow light, green light, and/or red light, and outputs white light. For example, the light source unit 20 that can emit blue light and the wavelength conversion sheet containing a phosphor that can emit yellow light can be combined to obtain white light. Alternatively, the light source unit 20 that can emit blue light and the wavelength conversion sheet containing a red phosphor and a green phosphor may be combined. Further, the light source unit 20 that can emit blue light and a plurality of the wavelength conversion sheets may be combined. As the plurality of wavelength conversion sheets, for example, a wavelength conversion sheet containing a phosphor that can emit red light and a wavelength conversion sheet containing a phosphor that can emit green light can be selected. Further, the light source unit 20 including the light-emitting element 21 that can emit blue light and the light source light-transmissive member 22 containing a phosphor that can emit red light, and a wavelength conversion sheet containing a phosphor that can emit green light may be combined.

As the yellow phosphor used in the wavelength conversion sheet, preferably the yttrium aluminum garnet phosphor described above is used, for example. Further, as the green phosphor used in the wavelength conversion sheet, preferably a phosphor having a narrow half band width of a light emission peak wavelength is used, such as, for example, a phosphor having the perovskite structure described above or a quantum dot phosphor. Further, as the red phosphor used in the wavelength conversion sheet, preferably, similar to the green phosphor, a phosphor having a narrow half band width of a light emission peak wavelength is used, such as, for example, the KSF based phosphor, the KSAF based phosphor, or the quantum dot phosphor described above.

The first light source 20A can further include a covering member 24. The covering member 24 is disposed on a lower surface of the light-emitting element 21. The covering member 24 is disposed with lower surfaces of electrodes 25 of the first light source 20A exposed from the covering member 24. The covering member 24 is also disposed on a lower surface of the light source light-transmissive member 22 covering the lateral surfaces of the light-emitting element 21.

The covering member 24 has reflectivity with respect to light emitted by the first light source 20A. The covering member 24 is, for example, a resin member including light-scattering particles. As the light-scattering particles of the covering member 24, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used, for example. As the resin material of the covering member 24, a thermoplastic resin such as acrylic resin, polycarbonate resin, cyclic polyolefin resin, polyethylene terephthalate resin, or polyester resin, or a thermosetting resin such as epoxy resin or silicone resin, can be used, for example.

The first light source 20A includes a first light adjustment member 23. The first light adjustment member 23 is disposed on an upper surface of the first light source 20A. The first light adjustment member 23 covers an upper surface of the light-emitting element 21. The first light adjustment member 23 is disposed on the upper surface of the light source light-transmissive member 22, and controls an amount and an output direction of light output from the upper surface of the light source light-transmissive member 22. The first light adjustment member 23 has reflectivity and transmissivity with respect to light emitted by the light-emitting element 21. One portion of the light output from the upper surface of the light source light-transmissive member 22 is reflected by the first light adjustment member 23, and the other portion is transmitted through the first light adjustment member 23. A transmittance of the first light adjustment member 23 with respect to a peak wavelength of the light-emitting element 21 is, for example, preferably in a range from 1% to 50%, and more preferably in a range from 3% to 30%. As a result, the brightness immediately above the first light source 20A is decreased, and a brightness unevenness of the planar light source 300 is reduced.

The first light adjustment member 23 can be constituted by a light-transmissive resin and light-scattering particles contained in the light-transmissive resin. As the light-transmissive resin, a thermoplastic resin such as acrylic resin, polycarbonate resin, cyclic polyolefin resin, polyethylene terephthalate resin, or polyester resin, or a thermosetting resin such as epoxy resin or silicone resin can be used, for example. As the light-scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used, for example. Further, the first light adjustment member 23 may be, for example, a metal member such as aluminum or silver, or a dielectric multilayer film.

The first light source 20A need not include the covering member 24. For example, a lower surface of the light source may be configured by the lower surface of the light-emitting element 21 and the lower surface of the light source light-transmissive member 22. In another form, the first light source 20A may be only a single unit of the light-emitting element 21. In another form, the first light source 20A may not include the covering member 24 and the light source light-transmissive member 22, and the first light adjustment member 23 may be disposed on the upper surface of the light-emitting element 21. In another form, the first light source 20A may not include the light source light-transmissive member 22, the first light adjustment member 23 may be disposed on the upper surface of the light-emitting element 21, and the covering member 24 may be disposed on the lower surface of the light-emitting element 21.

Light-Reflective Member 30

The light-reflective member 30 is a member having reflectivity with respect to the light emitted by the light source unit 20. The light-reflective member 30 is, for example, a resin member including light-scattering particles. As the light-scattering particles of the light-reflective member 30, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used, for example. As the resin material of the light-reflective member 30, a thermoplastic resin such as acrylic resin, polycarbonate resin, cyclic polyolefin resin, polyethylene terephthalate resin, or polyester resin, or a thermosetting resin such as epoxy resin or silicone resin, can be used, for example.

The light-reflective member 30 includes the first light-reflective member 31. The reflectivity of the first light-reflective member 31 with respect to the peak wavelength of the first light source 20A is, for example, preferably at least 60%, and more preferably at least 80%. With this structure, the light from the first light source 20A is readily blocked by the first light-reflective member 31.

The first light-reflective member 31 covers at least a portion of the first lateral surface 11C facing the first extending portion 11D. The first light-reflective member 31 covers at least a portion of the first extending portion 11D facing the first lateral surface 11C. With the first light-reflective member 31 covering at least a portion of the first lateral surface 11C facing the first extending portion 11D and at least a portion of the first extending portion 11D facing the first lateral surface 11C, a portion of the light output from the first light source 20A and traveling in the +X direction can be blocked by the first light-reflective member 31. This allows for increasing the difference in brightness/darkness between the light-emitting region and the non-light-emitting region. The first light-reflective member 31 and the first extending portion 11D are preferably in contact with each other. With this structure, light from the first light source 20A can be facilitated to exit from the first extending portion 11D. In a cross-sectional view, the first light-reflective member 31 preferably covers the first lateral surface 11C in its entirety. With this structure, a portion of the light having exited from the first light source 20A and traveling in the +X direction is more readily blocked by the first light-reflective member 31.

Figure 7A:
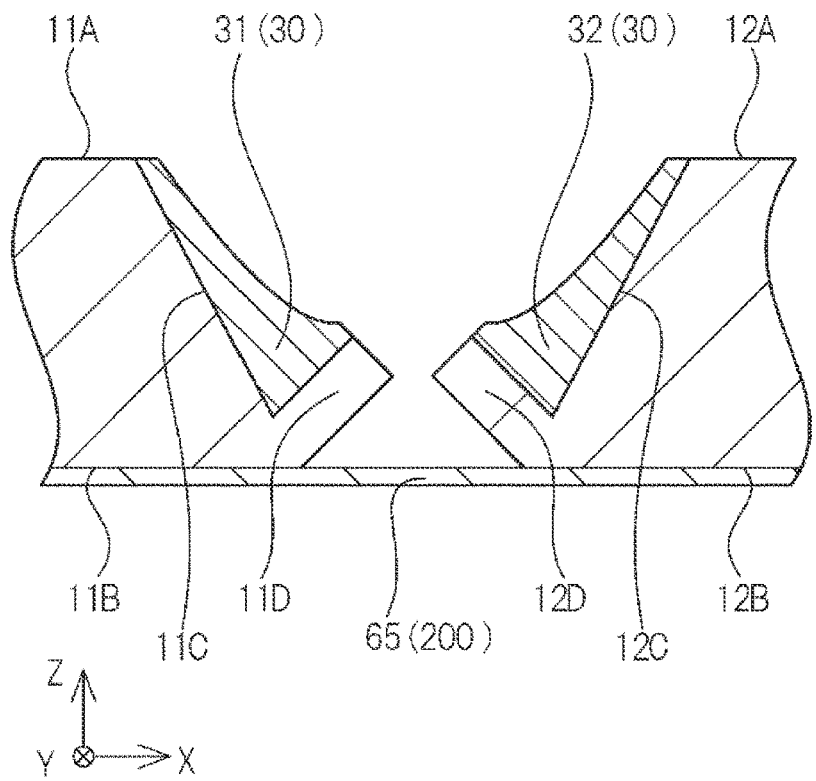
FIG. 7A is a schematic cross-sectional view illustrating a periphery of a modified example of the first extending portion, the second extending portion, and the first reflective member according to the embodiment.

A thickness of the first light-reflective member 31 is not particularly limited. As illustrated in FIG. 3A, the thickness of the first light-reflective member 31 may be substantially uniform. As illustrated in FIG. 7A, the thickness of the first light-reflective member 31 may become thicker or thinner as a distance to the second light guide portion decreases.

Figure 7B:
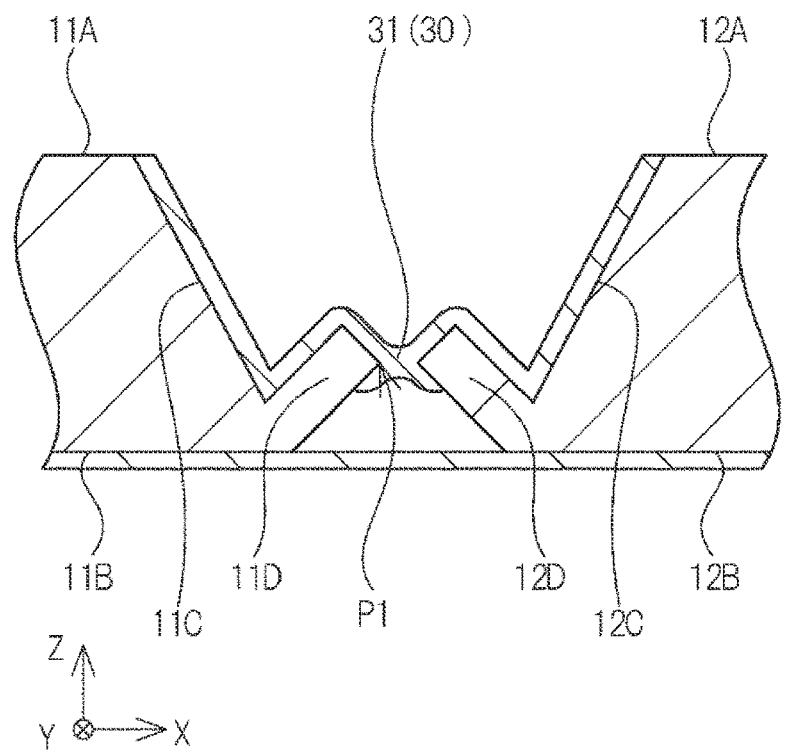
FIG. 7B is a schematic cross-sectional view illustrating a periphery of a modified example of the first extending portion, the second extending portion, and the first reflective member according to the embodiment.

As illustrated in FIG. 3A, the first light-reflective member 31 does not cover the point P1 that is within the first extending portion 11D and is closest to the second light guide portion 10B in a cross-sectional view. With the first light-reflective member 31 not covering the point P1 that is within the first extending portion 11D and is closest to the second light guide portion 10B in a cross-sectional view, a decrease in brightness can be inhibited in the vicinity of the first extending portion 11D. As illustrated in FIG. 7B, the first light-reflective member 31 may cover the point P1 that is within the first extending portion 11D and is closest to the second light guide portion 10B in a cross-sectional view. With the first light-reflective member 31 covering the point P1 that is within the first extending portion 11D and is closest to the second light guide portion 10B in a cross-sectional view, the output of the light from the first light source 20A from the first extending portion 11D to outside the first light guide portion can be reduced. This allows for inhibiting an increase in brightness in the vicinity of the first extending portion 11D.

As illustrated in FIG. 3A, the first light-reflective member 31 is separated from the second extending portion 12D. As illustrated in FIG. 7B, the first light-reflective member 31 may cover at least a portion of the second extending portion 12D. With the first light-reflective member 31 covering at least a portion of the second extending portion 12D, an increase in brightness in the vicinity of the second extending portion 12D can be reduced.

The first light-reflective member 31 may cover the third extending portion 11F extending continuously from a portion of a lateral surface of the first light guide portion 10A other than the first lateral surface. With this structure, it is possible to increase the difference in brightness/darkness between the light-emitting region and the non-light-emitting region on a lateral surface of the first light guide portion 10A other than the first lateral surface as well. In a plan view, the first light-reflective member 31 may seamlessly surround the first light source 20A.

As illustrated in FIG. 3A, the light-reflective member 30 may include a second light-reflective member 32. The second light-reflective member 32 is a separate body separated from the first light-reflective member. The second light-reflective member 32 covers at least a portion of the second lateral surface 12C facing the second extending portion 12D and at least a portion of the second extending portion 12D facing the second lateral surface 12C. Therefore, entry of a portion of the light output from the second light source 20B and traveling in the −X direction into the first light guide portion 10A can be reduced by the second light-reflective member 32. Further, a portion of the light output from the first light source 20A and traveling in the +X direction can be blocked by the second light-reflective member 32. This allows for increasing the difference in brightness/darkness between the light-emitting region and the non-light-emitting region.

The second light-reflective member 32 may cover the fourth extending portion 12F extending continuously from a portion of a lateral surface of the second light guide portion 10B other than the second lateral surface. With this structure, it is possible to increase the difference in brightness/darkness between the light-emitting region and the non-light-emitting region on a lateral surface of the second light guide portion 10B other than the second lateral surface as well. In a plan view, the second light-reflective member 32 may seamlessly surround the second light source 20B.

Figure 7C:
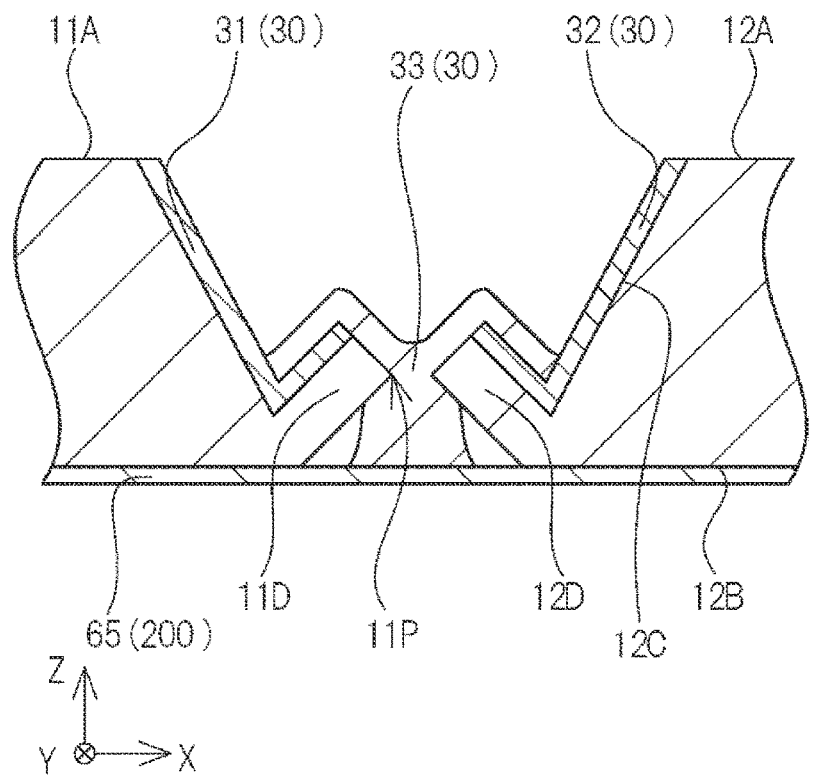
FIG. 7C is a schematic cross-sectional view illustrating a periphery of the first extending portion, the second extending portion, and a third reflective member according to the embodiment.

As illustrated in FIG. 7C, the light-reflective member 30 may include a third light-reflective member 33 that covers the first extending portion 11D. The third light-reflective member 33 is in contact with the first extending portion 11D. The third light-reflective member 33 may cover the first extending portion 11D with the first light-reflective member 31 interposed therebetween. The third light-reflective member 33 preferably covers the point P1 that is within the first extending portion 11D and is closest to the second light guide portion 10B. With this structure, it is possible to reduce an increase in brightness in the vicinity of the first extending portion 11D. The third light-reflective member 33 may cover the second extending portion 12D. The third light-reflective member 33 is in contact with the second extending portion 12D. The third light-reflective member 33 may cover the second extending portion 12D with the second light-reflective member 32 interposed therebetween. The third light-reflective member 33 preferably covers the first extending portion 11D and the second extending portion 12D. With this structure, it is possible to reduce an increase in brightness between the first extending portion 11D and the second extending portion 12D.

Figure 7D:
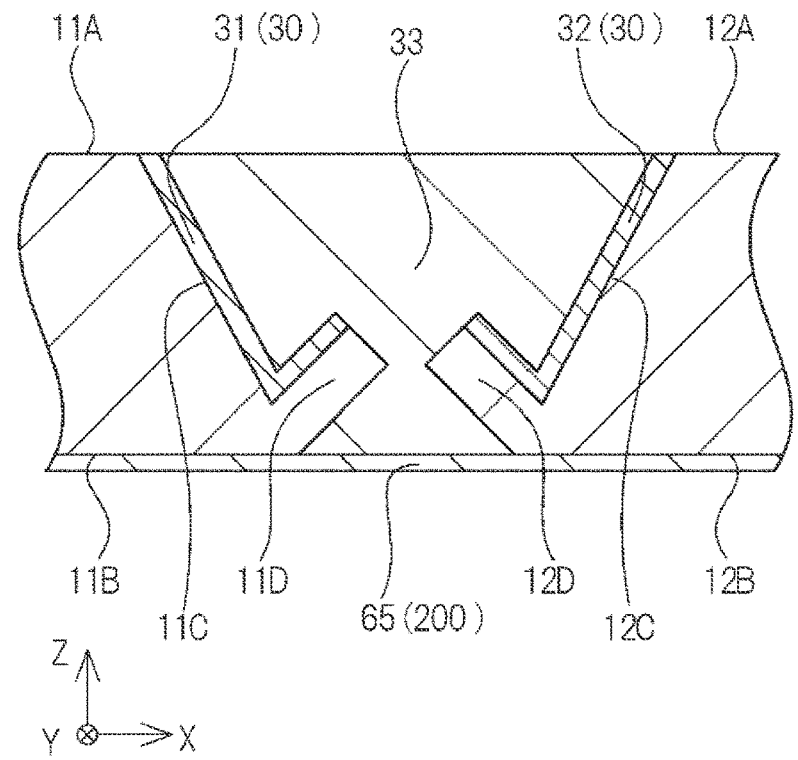
FIG. 7D is a schematic cross-sectional view illustrating a periphery of a modified example of the first extending portion, the second extending portion, and the third reflective member according to the embodiment.

As illustrated in FIG. 7C, the third light-reflective member 33 is in contact with the support member 200. With this structure, a portion of the light output from the first light source 20A and traveling in the +X direction is more readily blocked by the third light-reflective member 33. Note that the third light-reflective member 33 may be separated from the support member 200. As illustrated in FIG. 7C, a portion of the first extending portion 11D and/or the second extending portion 12D is exposed from the third light-reflective member 33. As illustrated in FIG. 7D, the first extending portion 11D and the second extending portion 12D may be embedded in the third light-reflective member 33.

Figure 8A:
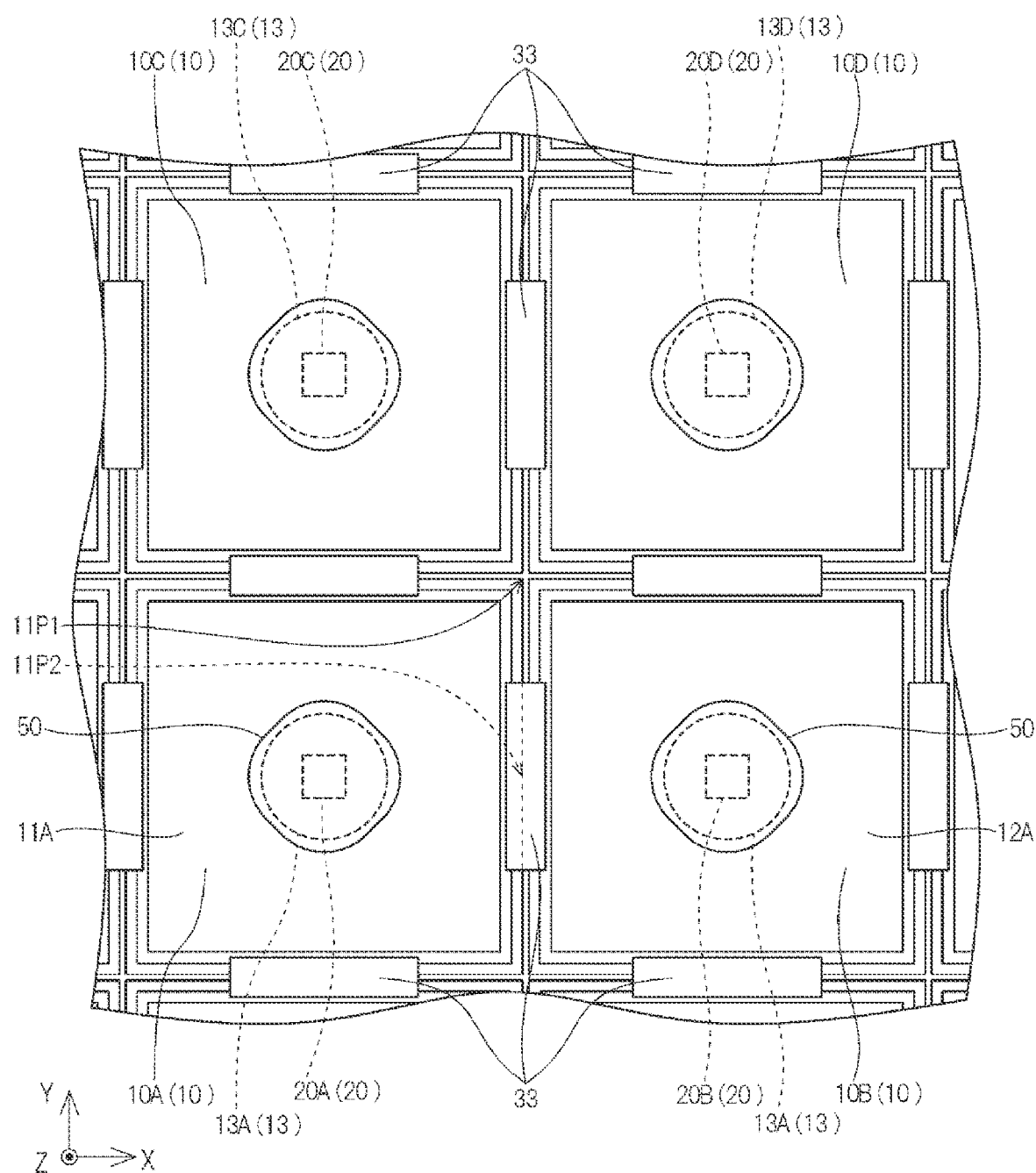
FIG. 8A is a schematic plan view illustrating a modified example of the planar light source according to the embodiment.

In a plan view, the third light-reflective member 33 may seamlessly surround the first light source 20A, and the third light-reflective member 33 may be provided only in a portion of a periphery of the first light source 20A. As illustrated in FIG. 8A, the third light-reflective member 33 may cover the outer edge 11P2 of the first extending portion 11D closest to the center of the first light source 20A in a plan view, and expose the outer edge 11P1 of the first extending portion 11D farthest from the center of the first light source 20A in a plan view. The brightness tends to decrease as the distance from the first light source 20A increases. Therefore, with the outer edge 11P2 of the first extending portion closest to the center of the first light source being covered by the third light-reflective member 33, an increase in brightness in the vicinity of the outer edge of the first extending portion closest to the center of the first light source can be reduced. Further, with the outer edge 11P1 of the first extending portion farthest from the center of the first light source being exposed from the third light-reflective member 33 in a plan view, a decrease in brightness in the vicinity of the outer edge of the first extending portion farthest from the center of the first light source can be suppressed. This allows for reducing brightness unevenness in the first light guide portion 10A.

Figure 8B:
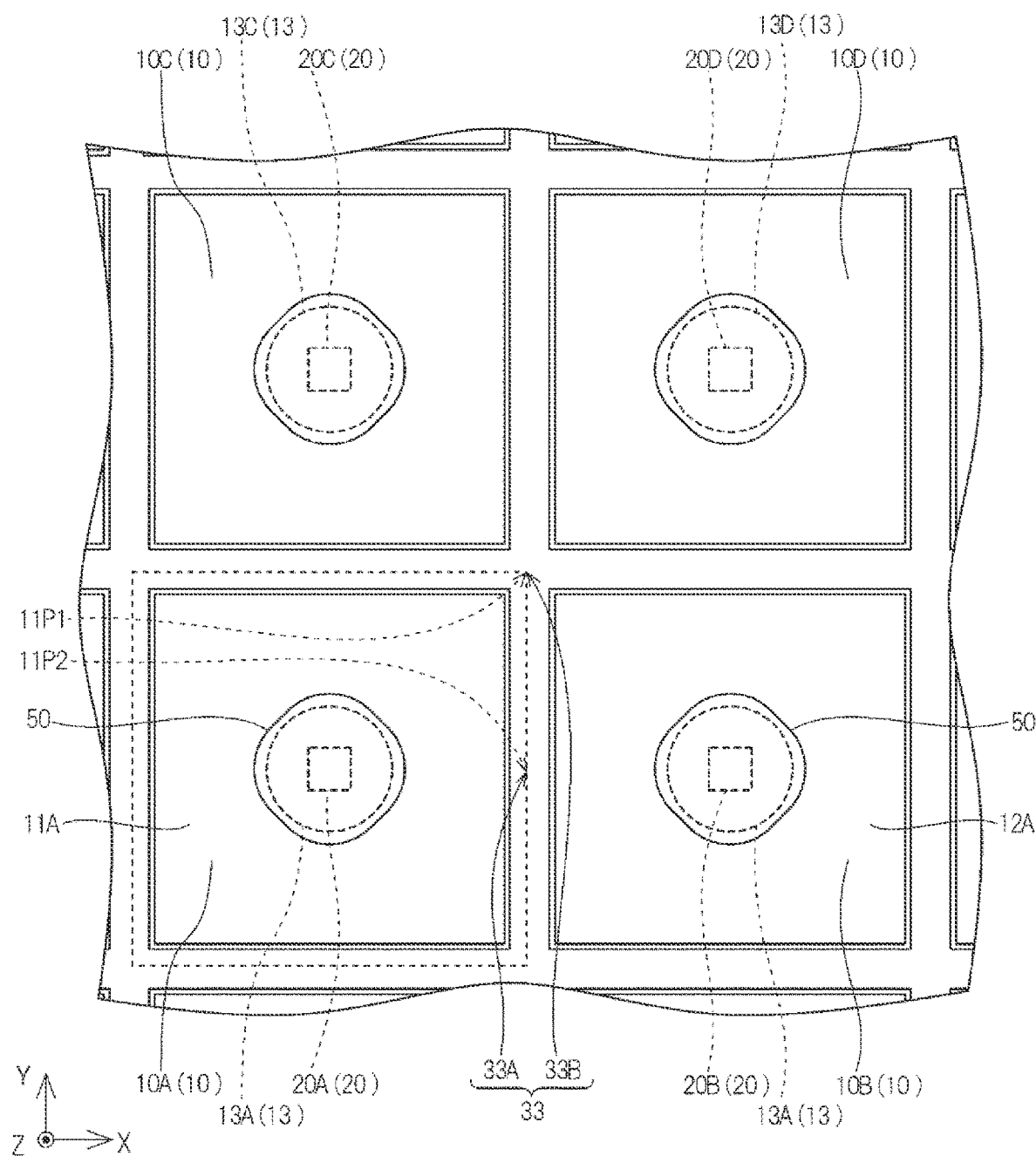
FIG. 8B is a schematic plan view illustrating a modified example of the planar light source according to the embodiment.

As illustrated in FIG. 8B, the third light-reflective member 33 may include a first portion 33A covering the outer edge 11P2 of the first extending portion 11D closest to the center of the first light source 20A in a plan view, and a second portion 33B covering the outer edge 11P1 of the first extending portion 11D farthest from the center of the first light source 20A in a plan view. A transmittance of the second portion 33B with respect to the peak wavelength of the first light source 20A is preferably higher than a transmittance of the first portion 33A with respect to the peak wavelength of the first light source 20A. With this structure, it is possible to reduce the brightness unevenness in the first light guide portion 10A. In a case in which the third light-reflective member 33 is a resin member including light-scattering particles, the transmittance of the second portion 33B can be made higher than the transmittance of the first portion 33A by reducing a ratio of the light-scattering particles contained in the second portion 33B to a ratio lower than that of the light-scattering particles contained in the first portion 33A. Further, the transmittance of the second portion 33B can be made higher than the transmittance of the first portion 33A by making a cross-sectional area of the third light-reflective member 33 in the second portion 33B smaller than a cross-sectional area of the third light-reflective member 33 in the first portion 33A. The cross-sectional area of the third light-reflective member 33 in the first portion 33A refers to the area of the third light-reflective member 33 in a cross section parallel to the third direction (Z direction) including the center of the first light source 20A and the outer edge 11P2 of the first extending portion 11D closest to the center of the first light source 20A. The cross-sectional area of the third light-reflective member 33 in the second portion 33B refers to the area of the third light-reflective member 33 in a cross section parallel to the third direction (Z direction) including the center of the first light source 20A and the outer edge 11P1 of the first extending portion 11D farthest from the center of the first light source 20A. The transmittance of the first portion 33A is the transmittance in the direction from the first light source 20A toward the first portion 33A. The transmittance of the second portion 33B is the transmittance in a direction from the first light source 20A toward the second portion 33B.

Light-Transmissive Member 40

The light-emitting module 100 may further include a light-transmissive member 40. The light-transmissive member 40 has transmissivity with respect to the light emitted by the light source unit 20. A transmittance of the light-transmissive member 40 with respect to the peak wavelength of the first light source 20A is, for example, preferably at least 50%, and more preferably at least 70%. As the material of the light-transmissive member 40, a resin, for example, can be used. For example, as the material of the light-transmissive member 40, the same resin as the material of the light guide member 10 or a resin having a small refractive index difference from the material of the light guide member 10 can be used.

The light-transmissive member 40 includes a first light-transmissive member 41 disposed in the first hole portion 11E and covering the first light source 20A, and a second light-transmissive member 42 disposed in the second hole portion 12E and covering the second light source 20B. The light-transmissive member 40 may further include a third light-transmissive member covering the third light source 20C and a fourth light-transmissive member covering the fourth light source 20D. The first light-transmissive member 41 is disposed between the first hole portion 11E and a lateral surface of the first light source 20A. The first light-transmissive member 41 may be disposed on the first light source 20A. The first light-transmissive member 41 is preferably in contact with the first light guide portion 10A and the first light source 20A. With this structure, the light from the first light source 20A is readily guided in the first light guide portion 10A. The second light-transmissive member 42 is disposed between the second hole portion 12E and a lateral surface of the second light source 20B. The second light-transmissive member 42 may be disposed on the second light source 20B. The second light-transmissive member 42 is preferably in contact with the second light guide portion 10B and the second light source 20B. With this structure, the light from the second light source 20B is readily guided in the second light guide portion 10B.

The light-transmissive member 40 may be constituted by a single layer or may be constituted by a layered body of a plurality of layers in the third direction (Z direction). Further, the light-transmissive member 40 may include a phosphor or light-scattering particles. In a case in which the light-transmissive member 40 is a layered body, each layer may or may not include a phosphor and/or light-scattering particles. For example, the light-transmissive member 40 may be constituted by a layer containing a phosphor and a layer not containing a phosphor.

Second Light Adjustment Member 50

The light-emitting module 100 may further include a second light adjustment member 50. The second light adjustment member 50 is disposed on the light-transmissive member 40. As illustrated in FIG. 1, the second light adjustment member 50 is disposed in a position overlapping the light source unit 20 in a plan view. The second light adjustment member 50 has reflectivity and transmissivity with respect to the light emitted by the light source unit 20. A transmittance of the second light adjustment member 50 with respect to the peak wavelength of the first light source 20A is, for example, preferably in a range from 1% to 50%, and more preferably in a range from 3% to 30%.

The second light adjustment member 50 can be constituted by a light-transmissive resin and light-scattering particles contained in the light-transmissive resin. As the light-transmissive resin, a thermoplastic resin such as acrylic resin, polycarbonate resin, cyclic polyolefin resin, polyethylene terephthalate resin, or polyester resin, or a thermosetting resin such as epoxy resin or silicone resin can be used, for example. As the light-scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used, for example. Further, the second light adjustment member 50 may be, for example, a metal member such as aluminum or silver, or a dielectric multilayer film.

An upper surface of the second light adjustment member 50 functions as a light-emitting surface of the light-emitting module 100 along with the first upper surface 11A of the light guide member 10. The second light adjustment member 50 reflects one portion of the light output from the light source unit 20 and traveling upward, and transmits the other portion. This allows for reducing the difference between a brightness of the region immediately above and surrounding the light source unit 20 and a brightness of the other region in the light-emitting surface of the light-emitting module 100. Thus, it is possible to reduce the brightness unevenness in the light-emitting surface of the light-emitting module 100. The transmittance of the second light adjustment member 50 with respect to the peak wavelength of the first light source 20A is preferably higher than the transmittance of the first light adjustment member 23 with respect to the peak wavelength of the first light source 20A. With this structure, the brightness unevenness of the region in which the second light adjustment member 50 is provided and the surrounding region thereof can be reduced.

Support Member 200

The light-emitting module 100 is disposed on the support member 200. An upper surface of the support member 200 and the first lower surface 11B of the first light guide portion 10A as well as the second lower surface 12B of the second light guide portion 10B face each other. As illustrated in FIG. 2, the light source unit 20 is disposed on the support member 200.

The support member 200 includes a wiring substrate 60. The wiring substrate 60 includes an insulating base material 60A and at least a first conductive member 60B disposed on a surface of at least one of an upper surface and a lower surface of the insulating base material 60A. The insulating base material 60A may be a rigid substrate, or may be a flexible substrate. Due to the thinning of the planar light source 300, the insulating base material 60A is preferably a flexible substrate. The insulating base material 60A may be constituted by a single layer or may be constituted by a layered body of a plurality of layers in the third direction (Z direction). For example, the insulating base material 60A may be constituted by a single-layer flexible substrate or may be constituted by a layered body of a plurality of rigid substrates. As the material of the insulating base material 60A, a resin such as polyimide can be used, for example. The first conductive member 60B is a metal film, such as a copper film, for example.

The support member 200 may further include a first adhesive member 63 disposed on the wiring substrate 60, a reflective member 64 disposed on the first adhesive member 63, and a second adhesive member 65 disposed on the reflective member 64.

The first adhesive member 63 is disposed on the upper surface of the insulating base material 60A. The first adhesive member 63 is disposed between the insulating base material 60A and the reflective member 64, and adheres the insulating base material 60A and the reflective member 64. The first adhesive member 63 is, for example, a resin layer including light-scattering particles. As the light-scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used, for example. As the resin of the first adhesive member 63, a thermoplastic resin such as acrylic resin, polycarbonate resin, cyclic polyolefin resin, polyethylene terephthalate resin, or polyester resin, or a thermosetting resin such as epoxy resin or silicone resin can be used, for example.

The reflective member 64 is disposed below the light guide member 10 and the light source unit 20. The reflective member 64 has reflectivity with respect to the light emitted by the light source unit 20. As the reflective member 64, for example, a resin member containing a large number of bubbles or a resin member containing light-scattering particles can be used. As the resin of the reflective member 64, a thermoplastic resin such as acrylic resin, polycarbonate resin, cyclic polyolefin resin, polyethylene terephthalate resin, or polyester resin, or a thermosetting resin such as epoxy resin or silicone resin can be used, for example. As the light-scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, or glass can be used, for example. With the support member 200 including the reflective member 64, it is possible to improve the brightness of the light extracted from the light-emitting surface of the planar light source.

The second adhesive member 65 is disposed between the reflective member 64 and the light guide member 10, and adheres the reflective member 64 and the light guide member 10. Further, the light source unit 20 may be disposed on the second adhesive member 65. The second adhesive member 65 has transmissivity with respect to the light emitted by the light source unit 20. As the material of the second adhesive member 65, an epoxy resin, an acrylic resin, or a cyclic polyolefin resin, can be used, for example.

The support member 200 may further include a first insulating layer 66. The first insulating layer 66 is disposed on a lower surface of the wiring substrate 60, and covers the first conductive member 60B. As the material of the first insulating layer 66, an epoxy resin, a urethane resin, or an acrylic resin can be used, for example.

The support member 200 may further include a second conductive member 70. The second conductive member 70 includes, for example, a resin and metal particles included in the resin. As the resin of the second conductive member 70, an epoxy resin or a phenol resin can be used, for example. As the metal particles, particles of copper or silver can be used, for example.

The second conductive member 70 includes a connecting portion 70A and a wiring line portion 70B. The connecting portion 70A passes through the second adhesive member 65, the reflective member 64, the first adhesive member 63, and the insulating base material 60A in the third direction (Z direction). The wiring line portion 70B is disposed on the lower surface of the insulating base material 60A. The wiring line portion 70B is connected to the connecting portion 70A and the first conductive member 60B.

A pair of the second conductive members 70 are separated from each other in correspondence with the electrodes 25 of the light source unit 20, the electrodes 25 being a positive-negative pair. The connecting portion 70A of one of the second conductive members 70 is connected to the electrode 25 on the positive side below the light source unit 20, and the connecting portion 70A of the other second conductive member 70 is connected to the electrode 25 on the negative side below the light source unit 20. The electrodes 25 of the light source unit 20 are electrically connected to the second conductive members 70 and the first conductive member 60B.

The support member 200 may further include a second insulating layer 67. The second insulating layer 67 covers and protects lower surfaces of the second conductive members 70.

Next, an example of a method of manufacturing the planar light source 300 will be described with reference to FIGS. 9A to 10G.

Figure 9A:
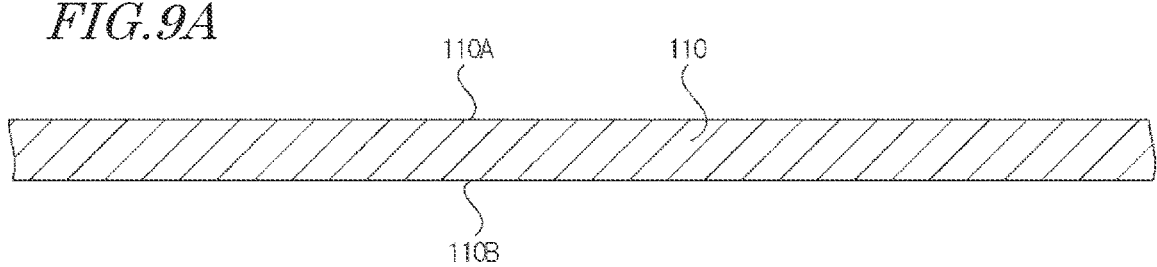
FIG. 9A is a schematic cross-sectional view illustrating a method of manufacturing the planar light source according to the embodiment.

A light guide plate 110 illustrated in FIG. 9A is prepared by being purchased or the like. The light guide plate 110 includes a first surface 110A and a second surface 110B positioned on a side opposite to the first surface 110A.

Figure 9B:
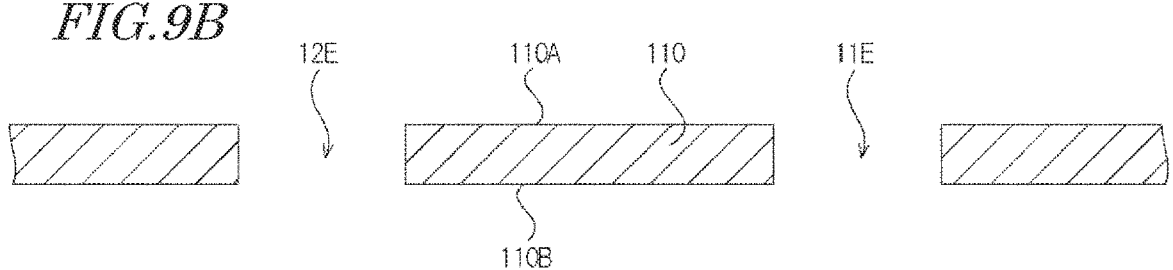
FIG. 9B is a schematic cross-sectional view illustrating the method of manufacturing the planar light source according to the embodiment.

As illustrated in FIG. 9B, the first hole 11E and the second hole 12E are formed in the light guide plate 110. The first hole portion 11E and the second hole portion 12E can be formed by, for example, drilling, punching, or laser machining. Members described as being obtained from respective steps may actually be provided by being purchased. For example, the light guide plate 110 illustrated in FIG. 9B with the first hole 11E and the second hole 12E formed therein may be prepared by being purchased. In the description of respective steps, a description that each member can be provided by being purchased may be omitted as appropriate.

Figure 9C:
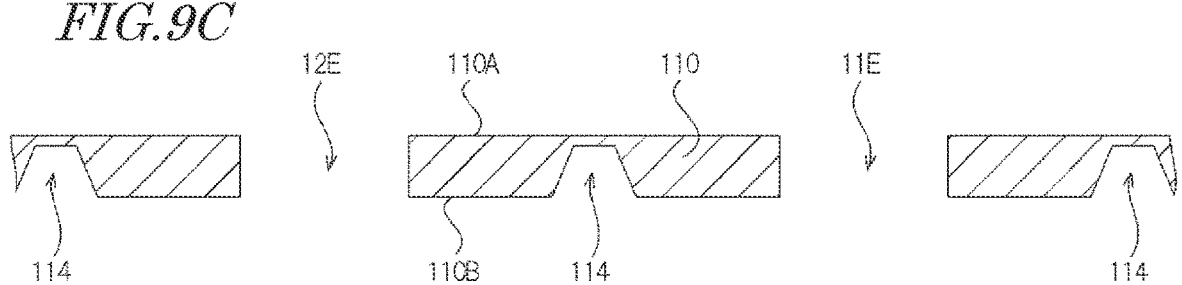
FIG. 9C is a schematic cross-sectional view illustrating the method of manufacturing the planar light source according to the embodiment.

As illustrated in FIG. 9C, a groove 114 is formed in the light guide plate 110. The groove 114 is formed as a bottomed groove open to the second surface 110B side. The groove 114 is formed by, for example, cutting or laser machining.

Figure 9D:
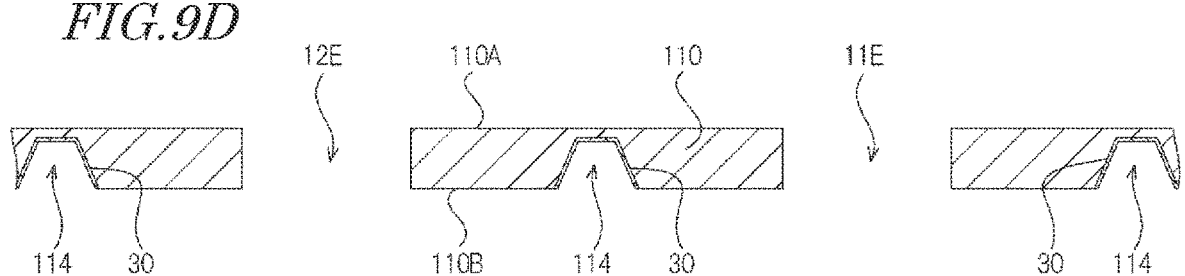
FIG. 9D is a schematic cross-sectional view illustrating the method of manufacturing the planar light source according to the embodiment.

As illustrated in FIG. 9D, the light-reflective member 30 is formed in the groove 114 of the light guide plate 110. The light-reflective member 30 is formed by a known method such as spraying, printing, or potting. In a case in which the light-reflective member 30 is formed by spraying, a mask may be applied to a surface of the light guide plate 110 to prevent the light-reflective member 30 from being formed in unnecessary areas.

Figure 9E:
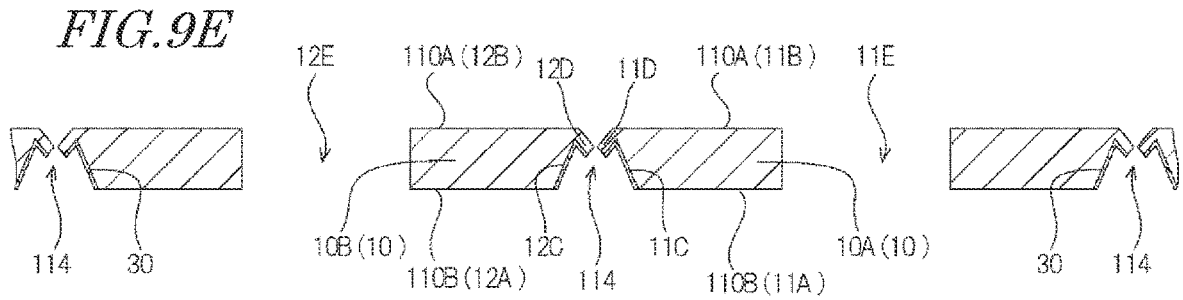
FIG. 9E is a schematic cross-sectional view illustrating the method of manufacturing the planar light source according to the embodiment.

As illustrated in FIG. 9E, the portion of the light guide plate connected to a bottom surface portion of the groove 114 is cut. Accordingly, the light guide plate can be separated into the first light guide portion 10A and the second light guide portion 10B. The light guide plate after being separated into the first light guide portion 10A and the second light guide portion 10B may be referred to as the light guide member 10. A known member such as a blade can be used for cutting. By cutting the bottom surface portion of the groove 114 from the first surface 110A side toward the second surface 110B, it is possible to incline a portion of the bottom surface portion of the cut groove 114 toward the second surface 110B. With this structure, the first extending portion 11D can be formed in the first light guide portion 10A. Further, the first lateral surface 10C of the first light guide portion 10A is defined by a portion of the groove 114. The first surface 110A of the light guide plate forms the first lower surface 11B of the first light guide portion 10A. The second surface 110B of the light guide plate forms the first upper surface 11A of the first light guide portion 10A. By separating the light guide plate into the first light guide portion 10A and the second light guide portion 10B, it is possible to reduce, to a greater extent, warping of the light guide plate caused by heat than in a case in which the light guide plate is connected with the groove 114. The second light guide portion 10B is similar to the first light guide portion 10A, and thus description thereof will be omitted as appropriate.

Figure 10A:
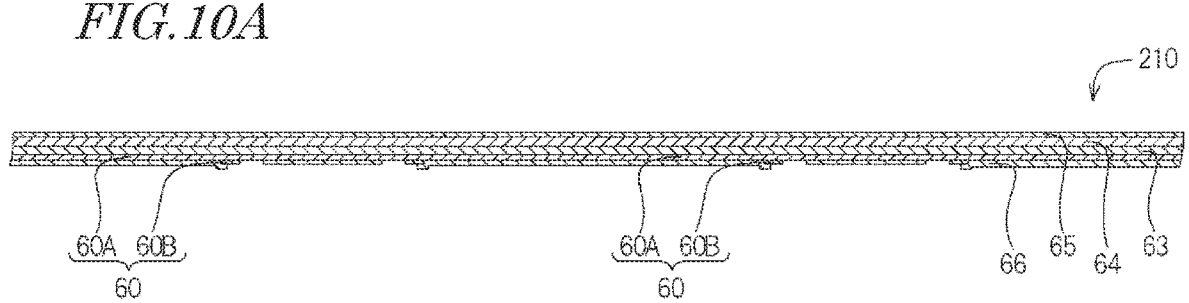
FIG. 10A is a schematic cross-sectional view illustrating the method of manufacturing the planar light source according to the embodiment.

A layered member 210 illustrated in FIG. 10A is prepared by procurement or the like. The layered member 210 includes the wiring substrate 60, the first adhesive member 63 disposed on the wiring substrate 60, the reflective member 64 disposed on the first adhesive member 63, and the second adhesive member 65 disposed on the reflective member 64. Preparing the layered member 210 may include preparing the wiring substrate 60 by procurement or the like and then disposing the first adhesive member 63 on the wiring substrate 60, disposing the reflective member 64 on the first adhesive member 63, and disposing the second adhesive member 65 on the reflective member 64. Members in the state of having not completed respective steps may be provided by purchasing. In description of respective steps, description that each member can be provided by purchasing may be omitted as appropriate. The layered member 210 may further include the first insulating layer 66 covering the lower surface of the wiring substrate 60. The layered member 210 is a portion of the support member 200 of the planar light source 300.

Figure 10B:
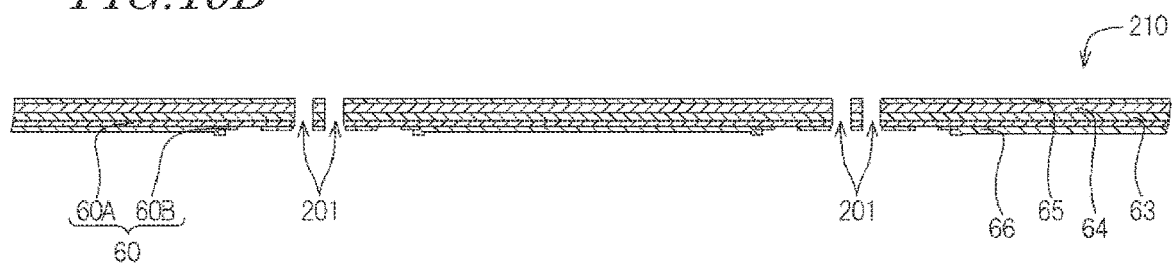
FIG. 10B is a schematic cross-sectional view illustrating the method of manufacturing the planar light source according to the embodiment.

As illustrated in FIG. 10B, through holes 201 passing through the second adhesive member 65, the reflective member 64, the first adhesive member 63, the wiring substrate 60, and the first insulating layer 66 are formed in the layered member 210. The through holes 201 are formed by, for example, punching, drilling, or laser machining. A shape of the through hole 201 in a plan view is circular. The shape of the through hole 201 in a plan view may be elliptical or polygonal in addition to circular. The through holes 201 are disposed with one through hole 201 facing one electrode (positive electrode, for example) and the other through hole 201 facing the other electrode (negative electrode, for example) of the positive-negative pair of the light source unit. In a plan view, one through hole 201 overlaps at least a portion of one electrode.

Figure 10C:
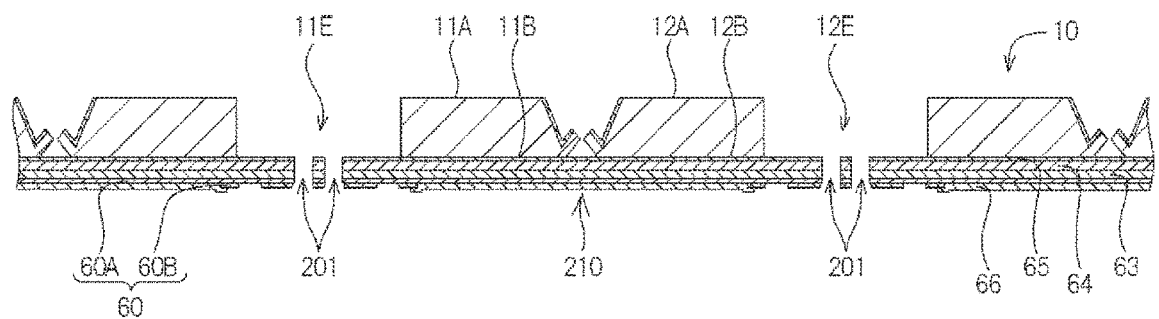
FIG. 10C is a schematic cross-sectional view illustrating the method of manufacturing the planar light source according to the embodiment.

As illustrated in FIG. 10C, the light guide member 10 is disposed on the layered member 210 in which the through holes 201 are formed. The first lower surface 11B of the light guide member 10 is adhered to the second adhesive member 65 of the layered member 210. The through holes 201 formed in the layered member 210 overlap the first hole portion 11E formed in the light guide member 10. In a plan view, the first hole portion 11E and two through holes 201 overlap.

Figure 10D:
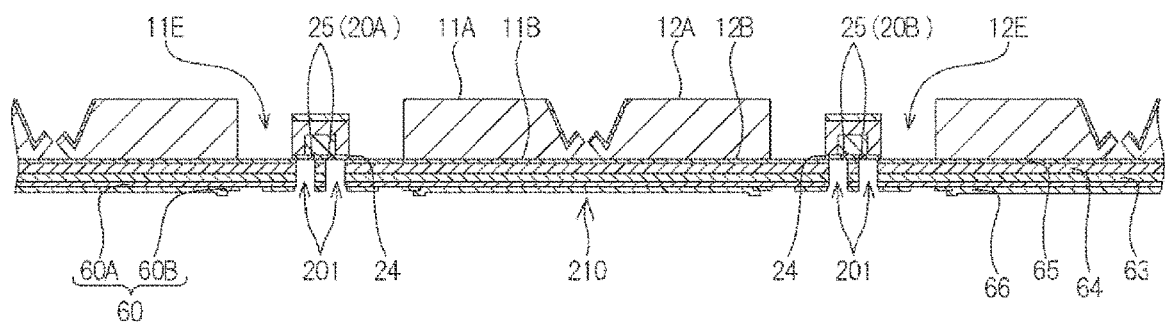
FIG. 10D is a schematic cross-sectional view illustrating the method of manufacturing the planar light source according to the embodiment.

As illustrated in FIG. 10D, the first light source 20A is disposed in the first hole portion 11E. For example, a lower surface of the covering member 24, which is a lower surface of the first light source 20A, and an upper surface of the second adhesive member 65 may be adhered. The first light source 20A is disposed with the electrodes 25 of the first light source 20A and the through holes 201 formed in the layered member 210 overlapping in a top view. The second light source 20B is similar to the first light source 20A, and thus description thereof will be omitted as appropriate.

Figure 10E:
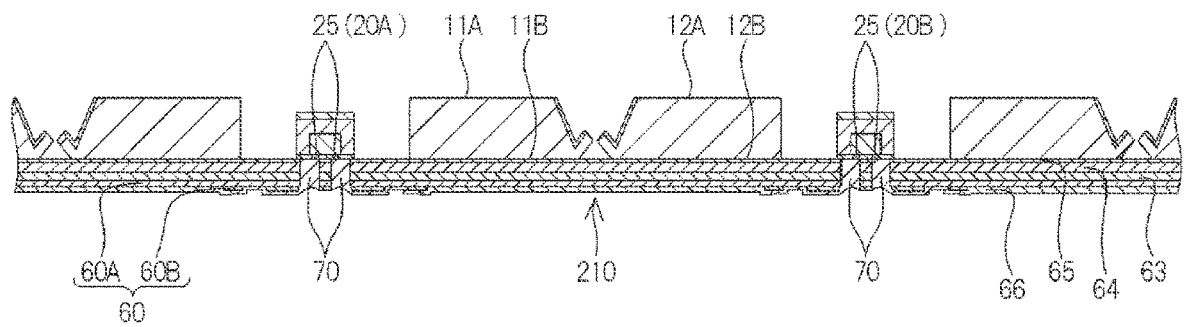
FIG. 10E is a schematic cross-sectional view illustrating the method of manufacturing the planar light source according to the embodiment.

After the first light source 20A is disposed in the first hole portion 11E, the second conductive members 70 are formed in the through holes as illustrated in FIG. 10E. A conductive paste, for example, is disposed in the through holes and then cured, making it possible to form the second conductive members 70 connected to the electrodes 25 of the first light source 20A. The second conductive members 70 are also formed in the lower surface of the wiring substrate 60, and are connected to the first conductive member 60B of the wiring substrate 60.

Figure 10F:
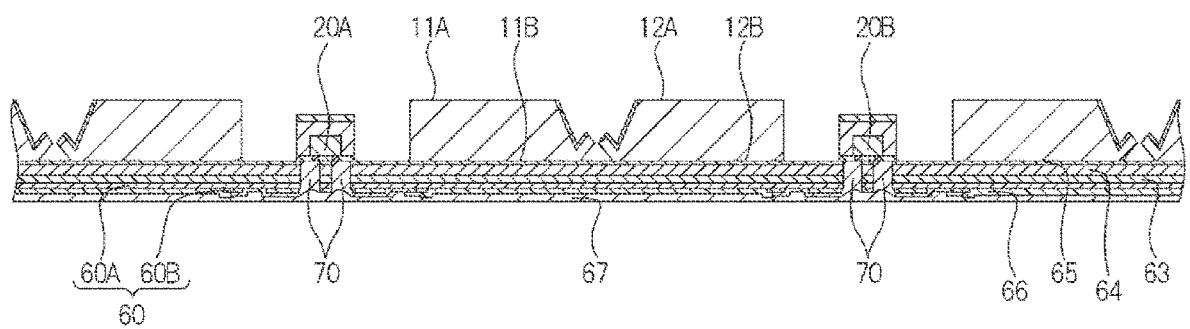
FIG. 10F is a schematic cross-sectional view illustrating the method of manufacturing the planar light source according to the embodiment.

As illustrated in FIG. 10F, the second insulating layer 67 covering the lower surfaces of the second conductive members 70 is formed. The second insulating layer 67 can be formed by, for example, a method such as printing, potting, spraying, ink jet, or the bonding of a resin sheet.

Figure 10G:
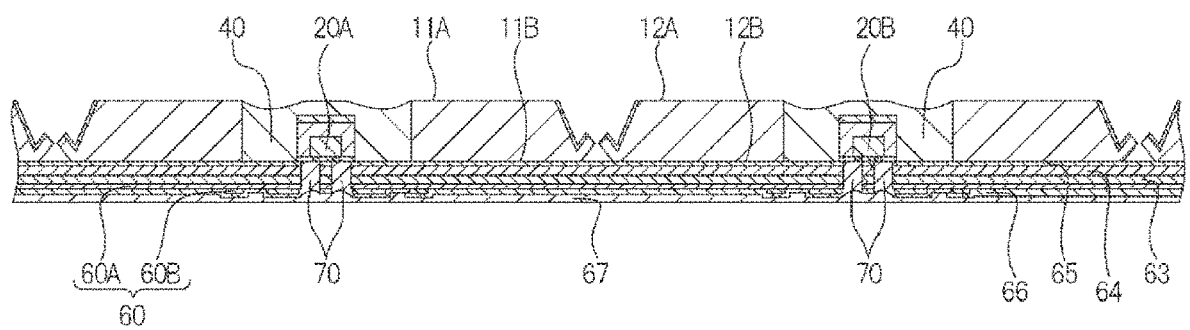
FIG. 10G is a schematic cross-sectional view illustrating the method of manufacturing the planar light source according to the embodiment.

After formation of the second insulating layer 67, the light-transmissive member 40 covering the first light source 20A is formed in the first hole portion as illustrated in FIG. 10G. The light-transmissive member 40 is formed covering the lateral surfaces of the first light source 20A. For example, the light-transmissive member 40 can be formed by supplying a liquid light-transmissive resin into the first hole portion and then heating and curing the light-transmissive resin.

After the light-transmissive member 40 is formed, the planar light source 300 illustrated in FIG. 2 can be manufactured by forming the second light adjustment member 50 that covers the light-transmissive member 40. The second light adjustment member 50 is formed by, for example, a method such as printing, potting, spraying, ink jet, or the bonding of a resin sheet. The method of manufacturing the planar light source 300 described above is an example, and various modifications are possible as long as there is no technical contradiction.

Embodiments of the present invention have been described above with reference to specific examples. However, the present invention is not limited to these specific examples. All aspects that can be practiced by a person skilled in the art modifying the design as appropriate based on the above-described embodiments of the present invention are also included in the scope of the present invention, as long as they encompass the spirit of the present invention. In addition, in the spirit of the present invention, a person skilled in the art can conceive of various modified examples and modifications, and those modified examples and modifications will also fall within the scope of the present invention.

What is claimed is:

1. A light-emitting module comprising:
    a light guide member comprising:
        a first light guide portion comprising:
            a first upper surface,
            a first lower surface positioned on a side opposite to the first upper surface,
            a first lateral surface positioned between the first upper surface and the first lower surface,
            a first extending portion facing the first lateral surface and extending continuously from a portion of the first lateral surface positioned on a first lower surface side of the first upper surface, and
            a first hole portion open at the first lower surface, and
        a second light guide portion comprising:
            a second upper surface,
            a second lower surface positioned on a side opposite to the second upper surface,
            a second lateral surface positioned between the second upper surface and the second lower surface,
            a second extending portion facing the second lateral surface and extending continuously from a portion of the second lateral surface positioned on a second lower surface side of the second upper surface, and
            a second hole portion open at the second lower surface;
    a light source unit comprising:
        a first light source positioned on the first lower surface side and disposed in the first hole portion, and
        a second light source positioned on the second lower surface side and disposed in the second hole portion; and
    a first light-reflective member covering at least a portion of the first lateral surface facing the first extending portion and at least a portion of the first extending portion facing the first lateral surface;
    wherein the first extending portion faces the second extending portion.

2. The light-emitting module according to claim 1, further comprising:
    a second light-reflective member covering at least a portion of the second lateral surface facing the second extending portion and at least a portion of the second extending portion facing the second lateral surface.

3. The light-emitting module according to claim 1, wherein the first light-reflective member covers a point that is within the first extending portion and is closest to the second light guide portion in a cross-sectional view.

4. The light-emitting module according to claim 1, wherein the first light-reflective member covers at least a portion of the second extending portion.

5. The light-emitting module according to claim 1, wherein:
- the first light source and the second light source are disposed side by side in a first direction; and
- in a cross-sectional view, a minimum length from the first extending portion to the second extending portion in a first direction is in a range from 0.01 times to 0.1 times a maximum length from a center of the first light source to the first extending portion in the first direction.

6. The light-emitting module according to claim 1, further comprising:
- a third light-reflective member that covers an outer edge of the first extending portion closest to a center of the first light source in a plan view and exposes an outer edge of the first extending portion farthest from the center of the first light source in a plan view.

7. The light-emitting module according to claim 1, further comprising:
- a third light-reflective member comprising:
   - a first portion covering an outer edge of the first extending portion closest to a center of the first light source in a plan view, and
   - a second portion covering an outer edge of the first extending portion farthest from the center of the first light source in a plan view,
- wherein a transmittance of the second portion is higher than a transmittance of the first portion.

8. The light-emitting module according to claim 1, wherein, in a cross-sectional view, an angle formed by (i) the first lower surface and (ii) a line connecting a point that is within the first extending portion and is closest to the second light guide portion and a point that is within the first lower surface and is closest to the second light guide portion is in a range from 105° to 165°.

9. A planar light source comprising:
- a support member; and
- the light-emitting module according to claim 1, disposed on the support member such that the first lower surface and the second lower surface face the support member.

* * * * *